(12) United States Patent
Dube

(10) Patent No.: US 7,177,426 B1
(45) Date of Patent: Feb. 13, 2007

(54) ELECTRONIC FILE PROTECTION USING LOCATION

(75) Inventor: Roger R. Dube, Boca Raton, FL (US)

(73) Assignee: Digital Authentication Technologies, Inc., Boca Raton, FL (US)

( * ) Notice: Subject to any disclaimer, the term of this patent is extended or adjusted under 35 U.S.C. 154(b) by 568 days.

(21) Appl. No.: 10/003,572

(22) Filed: Oct. 30, 2001

Related U.S. Application Data

(63) Continuation-in-part of application No. 09/948,730, filed on Sep. 7, 2001.

(60) Provisional application No. 60/296,923, filed on Jun. 8, 2001, provisional application No. 60/239,501, filed on Oct. 11, 2000, provisional application No. 60/245,491, filed on Nov. 3, 2000.

(51) Int. Cl.
*H04L 9/00* (2006.01)

(52) U.S. Cl. .............. 380/46; 380/35; 380/44; 380/262; 380/268; 380/270; 380/273; 380/277; 726/18; 726/21

(58) Field of Classification Search ........ 713/165–200; 380/258, 277
See application file for complete search history.

(56) References Cited

U.S. PATENT DOCUMENTS

| | | | |
|---|---|---|---|
| 4,972,431 A | | 11/1990 | Keegan |
| 4,993,067 A | | 2/1991 | Leopold |
| 5,412,730 A | * | 5/1995 | Jones ........................ 380/46 |
| 5,598,577 A | * | 1/1997 | Overfield ................... 710/10 |
| 5,640,452 A | | 6/1997 | Murphy |
| 5,659,617 A | * | 8/1997 | Fischer ...................... 380/258 |
| 5,933,498 A | * | 8/1999 | Schneck et al. ............. 705/54 |
| 6,429,773 B1 | * | 8/2002 | Schuyler .................. 340/425.5 |
| 2004/0049675 A1 | * | 3/2004 | Micali et al. ............... 713/158 |

OTHER PUBLICATIONS

Munro, J., "Windows Product Activation (WPA) for Windows XP", Aug. 6, 2001, PC Magazine, Ziff Davis Media Inc., entire document, http://www.extremetech.com/print_article2/0,1217,a=11079,00.asp.*

(Continued)

*Primary Examiner*—Nasser Moazzami
*Assistant Examiner*—Ronald Baum
(74) *Attorney, Agent, or Firm*—Patent Venture Group

(57) ABSTRACT

An invention for electronic file protection using location and other entropy factors is provided. Environment information regarding a computer is obtained, wherein the environment information includes data concerning an operating environment of the computer. Based on the environment information, an encryption key is generated and an electronic file is encrypted using the encryption key. A decryption key can also be created based on environment information, wherein the decryption key can be utilized to decrypt the electronic file. In addition, the environment information can include location information of the computer, drive information regarding a drive wherein the electronic file will be stored, and time information specifying access duration.

28 Claims, 14 Drawing Sheets

OTHER PUBLICATIONS

Fischer, Viktor, et al, 'Simple PLL-Based True Random Number Generator for Embedded Digital Systems', IEEE workshop on Design and Diagnostics of Electronic Circuits and Systems, Apr. 18-21, 2004, entire document, www.best.tuke.sk/simka/download/pub/fis_dru_sim_cel_04.pdf.*

Merriam-Webster's Collegiate Dictionary, 10th edition, Merriam-Webster, Inc. 1998, "environment" 1:, p. 387.

Schneier, Bruce, "Applied Cryptography," 1996, John Wiley & Sons, Inc., pp. 423-426, 174.

Ellison, C; and Schneier, B, "Ten Risks of PKI: What You're Not Being Told About Public Key Infrastructure," 2000, Computer Security Journal, vol. 16, No. 1, pp. 1-7.

\* cited by examiner

ELECTRONIC FILE PROTECTION USING LOCATION

CROSS REFERENCE TO RELATED APPLICATIONS

This application claims the benefit of U.S. Provisional Patent Application No. 60/296,923, filed on Jun. 8, 2001, entitled "Method for Protecting Electronic Files Using Location," the disclosure of which is incorporated by reference. This application is also a continuation-in-part of U.S. patent application Ser. No. 09/948,730, filed Sep. 7, 2001, entitled "Method and Apparatus for Real-Time Digital Certification of Electronic Files and Transactions Using Entropy Factors," which claims the benefit of U.S. Provisional Patent Application No. 60/239,501, filed on Oct. 11, 2000, entitled "Method and Apparatus for Real-Time Digital Certification of Electronic Files and Transactions," and U.S. Provisional Patent Application No. 60/245,491, filed on Nov. 3, 2000, entitled "Method and Apparatus for Real-Time Digital Certification of Electronic Files and Transactions Using Entropy Factors." The disclosures of each of these applications is incorporated by reference.

BACKGROUND OF THE INVENTION

1. Field of the Invention

This invention relates generally to electronic file protection, and more particularly to electronic file protection using location and other entropy factors.

2. Description of the Related Art

The use of public and private networks has fundamentally altered the manner in which business enterprises and government agencies communicate and conduct business. For example, the Internet, intranets and extranets are used to store, analyze and transmit information between and within organizations, and permit interactive, local, national or global communication on a real-time basis. Moreover, these networks are now used for electronic business-to-customer retail commerce and for electronic business-to-business commerce of all types.

Electronic files today are easily copied and transmitted widely throughout the world in a largely uncontrolled and nearly instantaneous fashion. Multiple computers connected through a variety of local and global networks can share information through the copying and electronic delivery of files. Further, a variety of tools have been developed to facilitate file sharing and communication, such as Virtual Private Networks ("VPN's"), Peer to Peer ("P2P") software, various instant messaging packages as well as others. Due to the wide availability of this software, computer files of all types are shared with increasing frequency. Moreover, the continuing reduction in the price of storage devices such as disk drives further encourages this activity, since the cost of local storage does not suppress the benefit obtained by having immediate and continual access to the data.

As a result, there is a strong and pressing need for a complete solution to the protection of copyrighted information in this electronic environment. Owners of copyrighted digital data, such as video files, audio files and reports, are very concerned about the proliferation of world wide sharing of files, since this often constitutes a direct violation of copyright laws and leads to the erosion of revenue due the owner. Some sharing engines caused such concern about copyright infringement that legal battles have risen to the highest courts in the land in an attempt by copyright owners of audio data to control the distribution of their material.

Several software solutions have been developed to attempt to address the problem of unauthorized duplication of electronic files, but these solutions are inadequate. Techniques such as strong encryption, digital watermarks and other forms of unique identification or access control are necessary but not sufficient protection of copyrighted material, as is evidenced by the fact that owners of copyrighted material have been very reluctant to offer their material over electronic distribution channels such as the Internet.

Digital watermarks imbed hidden information in a copyrighted file so that ownership can be demonstrated whenever a file with the watermark appears. Some implementations of the technology scramble the file so that it is not usable until unlocked by an authorized key. Keys, however, can be distributed just as easily as the source files, thereby neutering any protection afforded by the watermarking technology. Other solutions hide the watermark and require that the copyright owner "police" his property through the identification of illegal copies as they are found. The onus remains with the owner to enforce his ownership through legal prosecution of the person(s) holding the illegal copy. Still other implementations offer a "reduced function" access to the file (e.g., degraded audio performance so that a user may listen to the file before purchasing it) until the user purchases a license to the copyrighted material. The owner may further attempt to stem his losses by tracking the transmission trail of the document, although tools for such tracking are inadequate or missing entirely.

The reluctance of the owners of copyrighted information to migrate to electronic distribution or delivery of their material using digital watermarking is easily understood. Digital watermarking does not prevent the distribution of electronic material, but rather places the burden upon the owner to locate and then prosecute people holding illegal copies. The lack of tools to track the distribution path by which these copies were transmitted does not provide any assurances that such distribution will be stemmed by the prosecution activity. The ease with which keys can be distributed or posted in newsgroups gives further pause to copyright owners. Hence, a solution is needed in which copyrighted materials can be transmitted to an authorized purchaser with confidence that the file cannot be distributed in any usable fashion.

To address this issue, a variety of very strong encryption technologies have been developed over time. The strongest of the encryption technologies, public key encryption, employs dual-key systems in which each party has a public key that is widely distributed, and a private key that is kept secret to the user on his machine. Specifically, using public key infrastructure ("PKI") encryption, digital messages are encrypted and decrypted using ciphers or keys. FIG. 1 is an illustration showing a conventional public and private key pair 100. The public and private key pair includes a public key 102 and a private key 104. Each user of the system has a public key 102 and a private key 104 and must know the public key 102 of the intended recipients of its messages. In general, a message is encrypted and sent by a sender using the recipient's public key 102 and is then received and decoded by the recipient using his private key 104, as discussed in greater detail next.

FIG. 2 is an illustration of a conventional PKI system 200. In FIG. 2, two network computer users, Alice 202 and Bob 204, each have their own public and private key pair. Specifically, Alice 202 has a public and private key pair comprising a public key 206 and a private key 208. Similarly, Bob 204 has a public and private key pair comprising a public key 210 and a private key 212. The private keys 208 and 212 are secret numbers to which only the owner has access. In general each public key is generated using the following formula:

(1) $G^x mod P$, where G and P are large prime numbers and x is the user's private key. In this manner, eavesdroppers would have great difficulty determining x even if the values of G and P are known. Hence, the public keys 206 and 210 can be broadly disseminated without revealing the related private key. For example, Bob 204 and Alice 202 provide their public keys 210 and 206 to each other prior to initiation of encrypted communication.

Thereafter, whenever encrypted communication is to occur, the sender utilizes their private key in conjunction with the recipient's public key to encrypt the data being sent. Upon receipt, the recipient decrypts the data using the recipient's private key. For example, when Alice 202 wishes to send Bob 204 an encrypted message, Alice 202 encrypts the message using her private key 208 in conjunction with Bob's public key 210. Upon receipt, Bob decrypts the message using his private key 212.

PKI systems attempt to provide a high level of security and confidentiality because messages can be decoded only by persons having the recipient's private key. However, it is well known in the industry that a weakness of PKI technology is its susceptibility to the "man-in-the-middle" attack.

FIG. 3 is an illustration showing a PKI system 300 compromised by a middleman. In particular, FIG. 3 illustrates three network computer users, Alice 202, Bob 204, and Cindy 302, who in this example is the middleman. As in FIG. 2, Alice 202 has a public and private key pair comprising public key 206 and private key 208, and Bob 204 has a public and private key pair comprising public key 210 and private key 212. In addition, Cindy 302, the middleman, has a public and private key pair comprising public key 304 and private key 306. If Cindy 302 can intercept a transmission between Bob 204 and Alice 202, she can trick them into using her public key 304. In this attack, the attacker intercepts the transmission of a public key and replaces it with the attacker's false key, thereby effectively replacing the true sender as the trusted party. This enables the attacker to send, receive and decode messages intended for the original legitimate user.

For example, during a "man-in-the-middle" attack, Cindy 302 intercepts Alice's public key 206 and replaces it with Cindy's public key 304. Similarly, Cindy 302 intercepts Bob's public key 210 and replaces it with Cindy's public key 304. Bob 204 and Alice 202 each believe they have each other's public key, however, they actually have Cindy's public key 304. Later, during encrypted transmissions, both Alice 202 and Bob 204 unknowingly use Cindy's public key 304 in conjunction with their respective private keys to encrypt messages to each other, Which are actually intercepted by Cindy 302. Cindy 302 can decrypt the messages using her private key 306, and further, re-encrypt the messages using Cindy's private key 304 and the proper recipient's public key 206 and 210.

As deployed today, public key encryption cannot and does not have any means to authenticate the identities of either party involved in a transmission. The parties must rely upon trust or some other means of authentication in order to be certain that the identity of the other party is indeed the person with who they wish to communicate.

The strength of this public key encryption technology is state of the art today, with legendary estimates of the time and processing power required to crack a public key encrypted file. One estimate, for example, suggests that a file encrypted using moderate strength public key encryption would require all of the computers in the world working together for one year in order to decrypt the file without the benefit of the required secret key.

Although strong encryption provides protection of copyrighted material against decryption without the required secret key, there is no protection against the distribution of the secret key or the distribution of the file once the purchaser has decrypted it. Even if used in conjunction with digital watermarking technology, the daunting task required of the copyright owner to seek and prosecute violators of the copyright material creates a significant inhibition against migrating the distribution of copyrighted material to the electronic world.

A number of attempts have been made to increase system security in the prior art. The following is a list of prior art disclosures that provide some form of file security. However, as will be seen, none of the disclosures provides a level of security currently needed to ensure proper protection of today's highly sensitive data.

In U.S. Pat. No. 4,993,067, Leopold discloses a process by which location is used to reset a decryption key of a remote user. In this process, a user transmits a request for a new key to a communications satellite. The satellite then determines whether the location of the source is authorized. If so, it then sends instructions to the remote source for re-keying its decryption software. The system requires that the remote user be stationary, and that the satellite itself carry a location filter that blocks signals from non-authorized locations. This is practical only for application specific satellites and does not provide a means for authentication of the user's location.

In U.S. Pat. No. 5,343,529, Goldfine et. al. describe a system by which a user requesting access to data presents such a request to a server. The server then transmits a session-specific userid to the user, and simultaneously calculates a hash code based on that userid. The user calculates a hash code based on a pre-determined algorithm, and sends the code back to the server. If the two hash codes match, the user is considered authentic and access is allowed. The security of this system is only as good as the secrecy of the predetermined algorithm (static entropy), and does not employ location or dynamic entropy to further authenticate the user.

In U.S. Pat. No. 5,640,452, Murphy describes a system by which a receiver that receives encrypted television transmissions will only operate within a physical range around its pre-set location. The system employs a GPS receiver operating in close proximity to the receiving antenna. If the current location as received by the GPS unit is within an acceptable range of coordinates that have been stored within the antenna's local electronics, the circuitry sends an enabling pulse to a decryption chip which then decodes the received transmissions. The system is susceptible to short-circuiting the enabling line to enable the decryption chip at all times and failure of the GPS unit. Moreover, it does not involve a challenge/response process for authentication of the user or his location, nor does it employ dynamic entropy for enhanced security.

In view of the forgoing, there is a need for systems and methods that provide self-protecting electronic files. The self-protecting electronic files should protect themselves based on a set of variables defined by the copyright owner at the time of authentication and downloading. Furthermore, the file protection should preferably include location information that can be independently certified. Location information alone, although valuable, is not sufficient. Thus, the location should be authenticated to significantly reduce any possibility of location spoofing.

SUMMARY OF THE INVENTION

Broadly speaking, the present invention fills these needs by providing electronic file protection using location and other entropy factors. In one embodiment, a method for protecting electronic files is disclosed. Environment information regarding a computer is obtained, wherein the environment information includes data concerning the operating environment of the computer. Based on the environment information, an encryption key is generated and an electronic file is encrypted using the encryption key. A decryption key can also be created based on environment information, wherein the decryption key can be utilized to decrypt the electronic file. In addition, the environment information can include location information of the computer, drive information regarding a drive wherein the electronic file will be stored, and time information specifying access duration.

Another method for protecting electronic files is disclosed in a further embodiment of the present invention. An electronic file is stored that is encrypted using an encryption key. The encryption key is generated using a first environment profile that includes data concerning an operating environment of the computer. A second environment profile of the computer is obtained, again based on a current operating environment of the computer. A decryption key is generated based on the second environment profile, and the electronic file is decrypted using the decryption key. The encryption key and the decryption key can be further based on a passcode received from a user. In this aspect, the first environment profile can be appended to the passcode to generate the encryption key and the current environment profile can be appended to the passcode to generate the decryption key. Generally, the decryption key cannot decrypt the electronic file when the current environment profile does not match the first environment profile. In this case, a match occurs when the data in the current environment profile is within a predetermined range of the data in the first environment profile.

A further method for protecting electronic files is disclosed in another embodiment. A digital transaction is authenticated using a delay number based on a timing signal received from a remote source. In addition, environment information regarding a computer is obtained, wherein the environment information includes data concerning an operating environment of the computer. An encryption key is generated based on the environment information, and an electronic file is encrypted using the encryption key. In one aspect, the delay number is based on a delay time period between when the timing signal was transmitted and when the timing signal was received. Free electrons in a line of sight between the remote source and a receiver can cause the delay in the timing signal, as can variations in atmospheric conditions. As above, a decryption key can be generated based on environment information, and the decryption key can be utilized to decrypt the electronic file. Other aspects of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for electronic file protection using location and other entropy factors. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

In order to provide a thorough understanding of the present invention, two devices are defined. The first device, a "User Card", resides on a client computer system, disk drive or other electronic device that is employing the present invention. The term "card" is used figuratively and is not meant to limit the implementation or packaging of the present invention in any way. This User Card may reside entirely within a host device, may be plugged in to a host device, or otherwise electronically attached to the device through any one or more attachment means, such as PCM-CIA connector, serial port, parallel port, wireless connection, or other means. It will be apparent to those skilled in the art that these attachment means are intended to present examples and not intended to limit the present invention in any way. The second device, the "System Card", resides on the server computer system or other host which is controlling access to information and requires authentication of a user.

Figure 1:
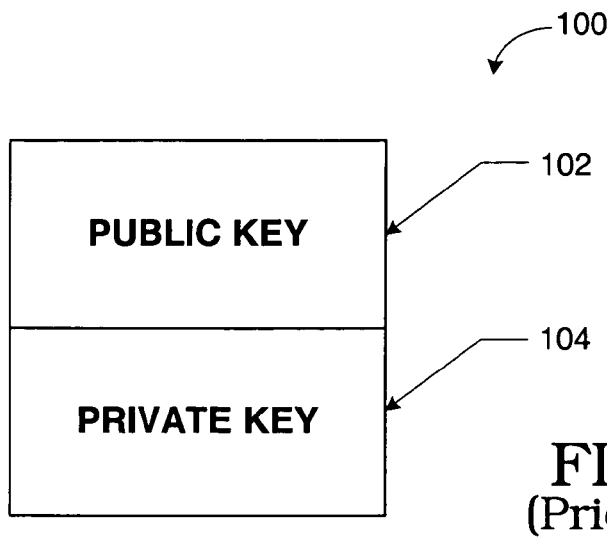
FIG. 1 is an illustration showing a conventional public and private key pair.
Figure 2:
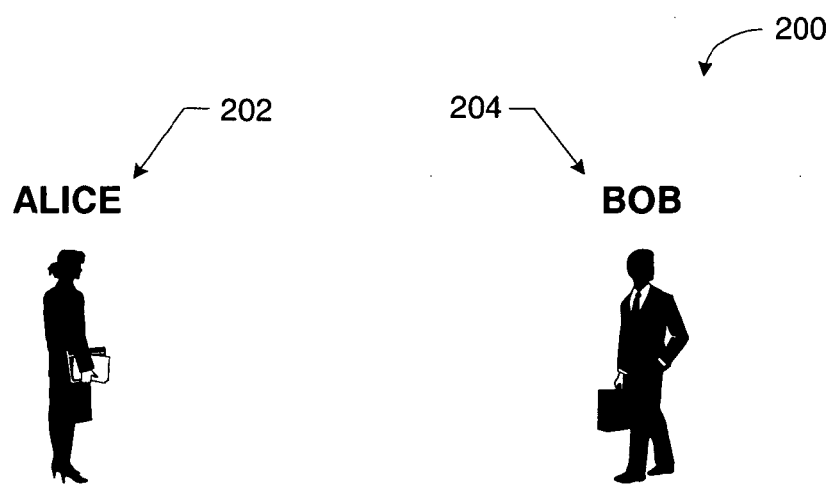
FIG. 2 is an illustration of a conventional PKI system.
Figure 2:
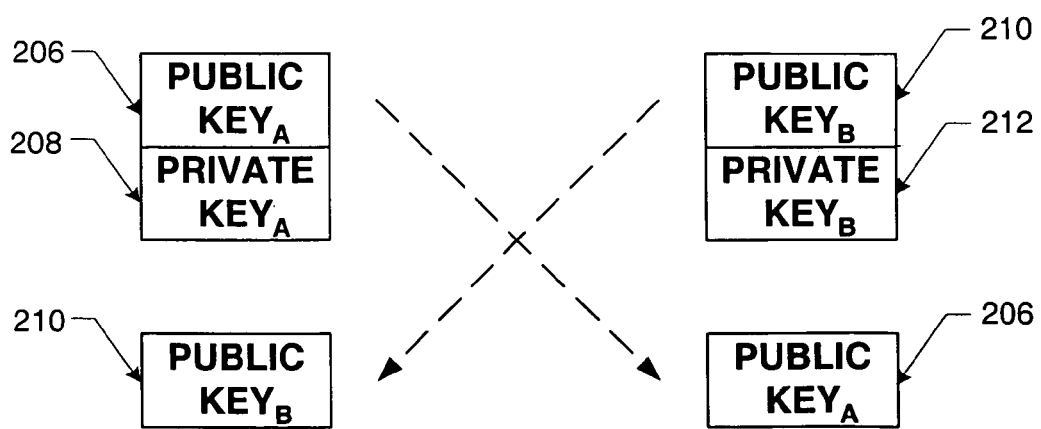
Figure 3:
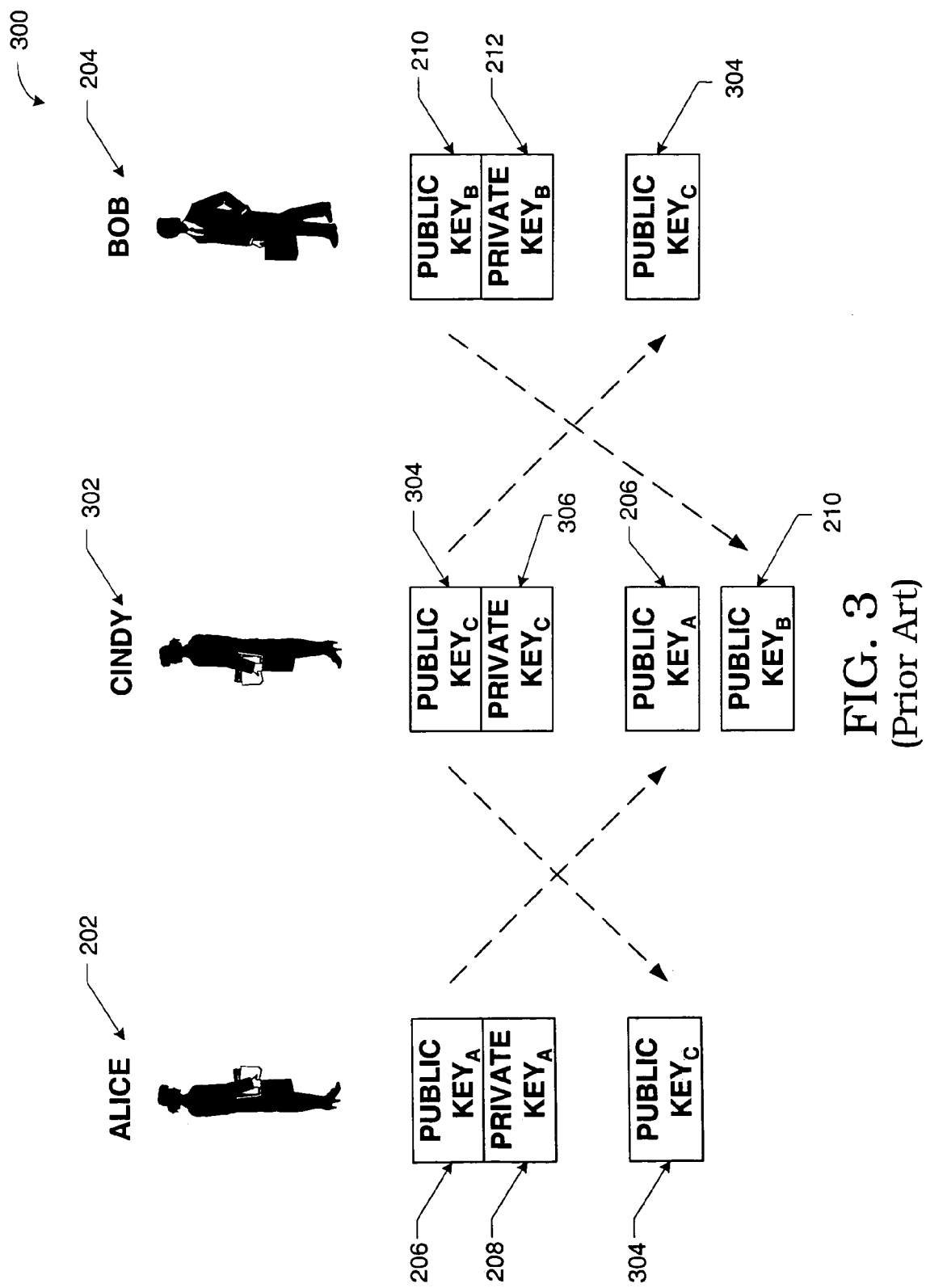
FIG. 3 is an illustration showing a PKI system compromised by a middleman.
Figure 4:
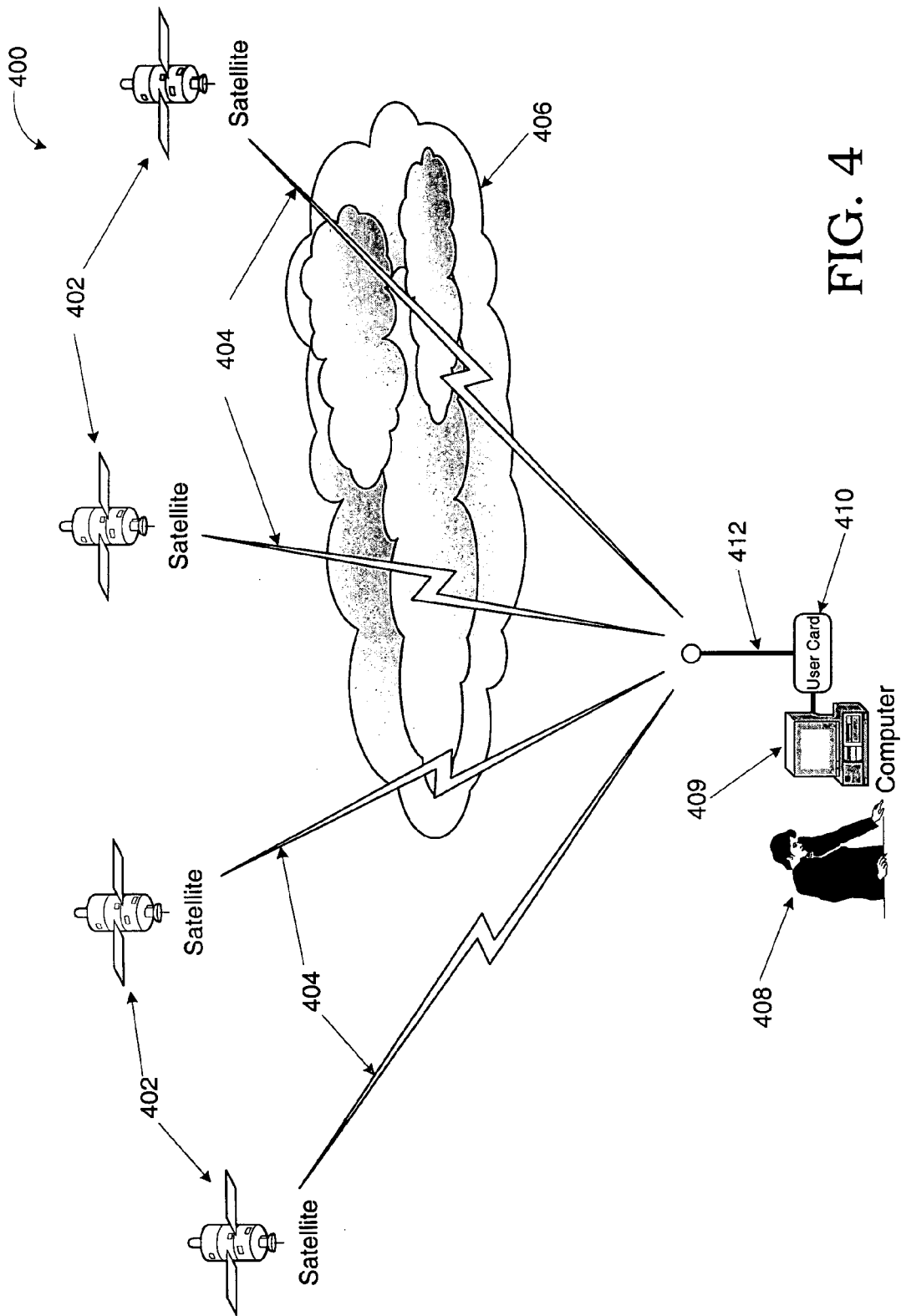
FIG. 4 is an illustration showing a client computer system that utilizes GPS data to facilitate authentication, in accordance with an embodiment of the present invention.

FIGS. 1, 2, and 3 have been described in terms of the prior art. FIG. 4 is an illustration showing a client computer system 400 that utilizes global positioning satellite (GPS) data to facilitate authentication, in accordance with an embodiment of the present invention. The client computer system 400 includes a GPS antenna 412 on a User Card 410, which is coupled to a client computer 409 operated by a user 408. Typically, the client computer 409 is further coupled to a network, which can be either a local area network (LAN) or a wide area network (WAN) such as the Internet. In addition, FIG. 4 shows satellites 402 of the GPS system, each providing timing signals 404, usually broadcast at 1.57 Ghz, that are received by the User Card 410 through the GPS antenna 412. The GPS system is a set of 24 satellites launched by the U.S. Department of Defense that are configured to facilitate identifying earth locations. Although the following description is in terms of GPS technology, it should be noted that any external timing signals can be utilized by the embodiments of the present invention. Further exemplary external timing signals include cell towers, LORAN, and Global Orbiting Navigational Satellite systems (GLONASS). Moreover, timing pulses over the Internet may be utilized as timing signals by the embodiments of the present invention.

In order to authenticate a transaction, the embodiments of the present invention place a person ("who") in time ("when") and in space ("where") as part of a transaction ("what"). As illustrated in FIG. 4, embodiments of the present invention utilize GPS data to facilitate authentication of a transaction. Each satellite 402 generates timing signals 404 that are received by the GPS antenna 412 and the User Card 410. The User Card 410 includes, among other things, the GPS antenna 412 and electronics that process these timing signals 404 to provide geophysical coordinates (longitude, latitude and altitude) which is subsequently used as part of the authentication process. The processing of these timing signals occurs independently and asynchronously from the client computer or host device 409.

The timing signals 404 include encoded time and date information that can be extracted by the User Card 410 and/or the client computer 409, as will be apparent to those skilled in the art. Further, by triangulation of signals from three of the satellites 410, the User Card 410 can pinpoint the current geophysical location of the computer anywhere on earth, generally to within a few meters. However, variations in the ionosphere and atmosphere 406 due to weather, barometric pressure, solar activity, and other variable and unpredictable parameters cause the purity of the timing signals 404 to fluctuate. In particular, the variations in the ionosphere and atmosphere cause unpredictable delays in the timing signals 404. To compensate for these variances, each satellite 402 of the GPS system transmits two timing signals 404 at two different frequencies (L1 and L2).

Figure 5:
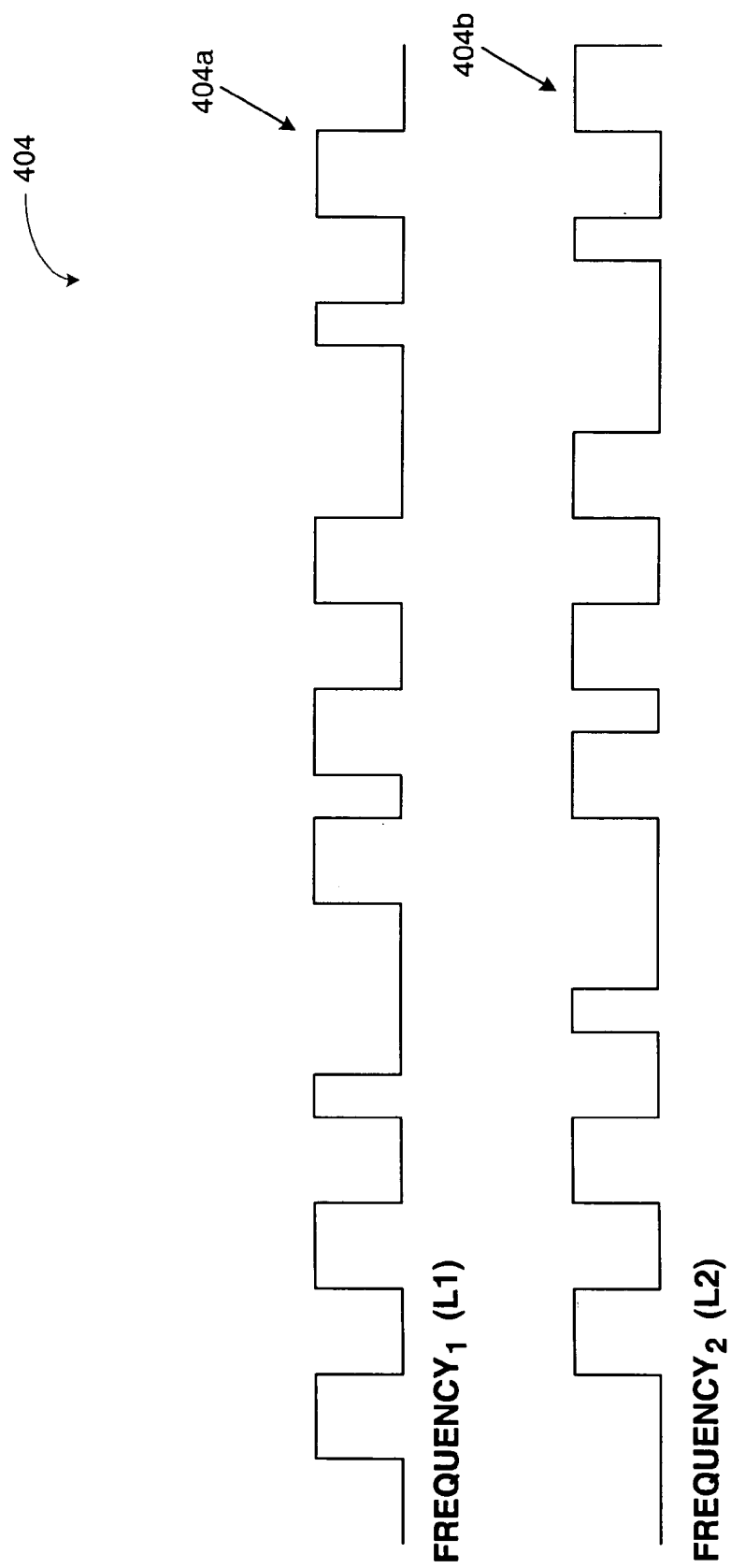
FIG. 5 is a timing diagram illustrating timing signals from a satellite of a GPS system.

FIG. 5 is a timing diagram illustrating timing signals 404 from a satellite of a GPS system. The timing signals 404 include a first timing signal 404a at a first frequency and second timing signal 404b at a second frequency. As FIG. 5 illustrates, the first and second timing signals 404a and 404b are offset from each other as a result of atmospheric variances. The delay of a radio signal is inversely proportional to the square of the carrier frequency (i.e. L2 will be delayed more than L1) and proportional to the total number of electrons along the path from the satellite to the receiver. The total number of electrons will vary according to the current solar activity, time of day (at the receiver), and longitude and latitude of the receiver. It is known to one practiced in the art that by measuring the delay between signals L1 and L2 from a particular satellite, one can calculate the effect due to the ionosphere and troposphere and correct for the variation, thereby improving positional accuracy. To compensate for the atmospheric variances, the embodiments of the present invention normalize the first and second timing signals 404a and 404b before determining geophysical location. As a result, accuracy for the location calculation is greatly improved.

In addition, embodiments of the present invention utilize the variances in timing signals 404 as a source for an unpredictable random number. In particular, measurement of the fluctuation in timing signal delay produces a random and unpredictable number whose value depends on the moment to moment value of the various parameters along the path from the satellite to the receiver. Therefore, this delay is specific to each satellite 402 and receiver 412 at a specific time and a specific location, and is extremely difficult, if not impossible, to calculate remotely. Moreover, each GPS satellite is continually moving along its orbit, thereby introducing additional delay variations as different parts of the Earth's atmosphere are sequentially interposed between the satellite and the receiver on the receiver antenna 412 on the User Card 410. This adds an additional element of variability and unpredictability which extends beyond just variations in the atmospheric line-of-sight conditions. Hence, essentially the only way to obtain such a delay is by direct measurement at the specific receiver on the User Card 410.

In some embodiments, the differences in the arrival times of the timing signal pulses 404 at the difference frequencies are measured. Since these differences are random, fluctuating, and unpredictable due to a wide variety of atmospheric, orbital and solar variables, this delay is unique to the precise time, date, and location of the receiver 412, and specific satellite timing signal 404 being received. Therefore, by measuring and storing the random delay as one or more numbers in memory of the User Card 410, another layer of "entropy" is added the overall system security, resulting in increased protection.

Entropy is a highly effective means of achieving strong encryption. In addition to the timing signal delay discussed above, a "secret" is another example of an entropy element that the embodiments of the present invention utilize to increase system security. A "secret", as used in the industry, is a piece of information known only to the user 408 or specific local User Card 410. A properly chosen "secret" makes it very difficult, if not impossible, for an outside party to guess the value of the secret. An example of a "secret" is a personal identification number (PIN) or passphrase. Because the introduction of such a non-predictable item adds randomness and uncertainty to the system, such a technique is said to add entropy to the system, resulting in dramatically increased overall security.

Referring back to FIG. 4, embodiments of the present invention can utilize four or more satellites 402 when acquiring timing signals 404. By using additional satellites 402, consistency can be checked and any errors discarded. Moreover, the embodiments of the present invention utilize various signal processing techniques and weak signal extraction to provide strong signal acquisition deep within buildings or in urban canyons, where the visibility of the sky is limited or missing entirely. Exemplary signal processing techniques utilized by embodiments of the present invention include Differential GPS (DGPS), Wireless Aided GPS (WAG), repeater systems, and methods of phase sensitive detection, each of which are known to those skilled in the art.

Figure 6:
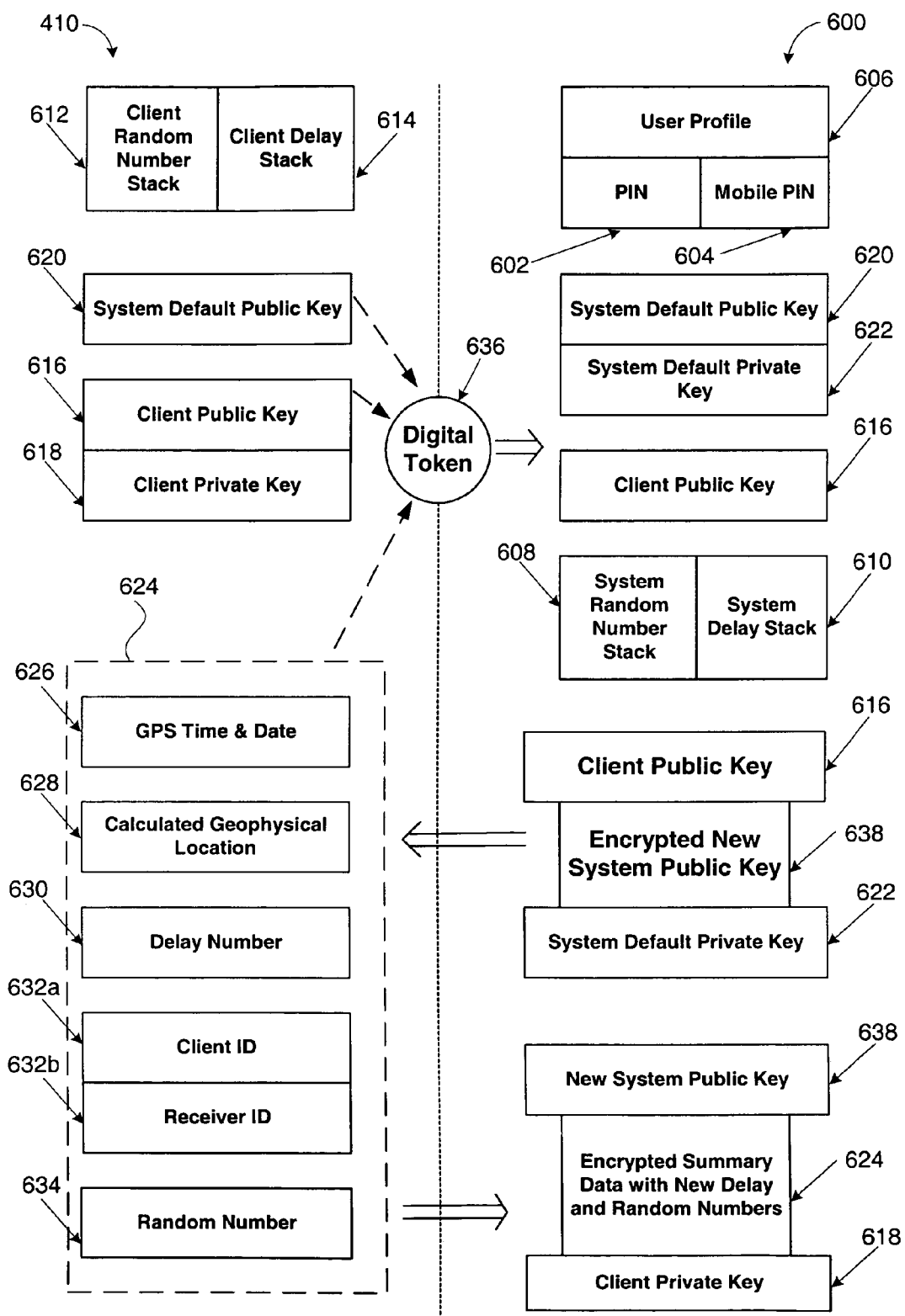
FIG. 6 is a block diagram showing a real-time digital authentication system, in accordance with an embodiment of the present invention.

FIG. 6 is a block diagram showing a real-time digital authentication system, in accordance with an embodiment of the present invention. The real-time digital authentication system includes User Card 410 on a client computer 409 and System Card 600. As discussed in greater detail subsequently, the real-time digital authentication system employs a combination of remote, personal, and local elements in such a manner as dramatically increase the security and protection of the system. In particular, the presence of elements whose values are not predictable from the outside add "entropy" to the security process and therefore dramatically increase the difficulty of hacking, breaking, deciphering or otherwise "spoofing" the system.

Figure 7:
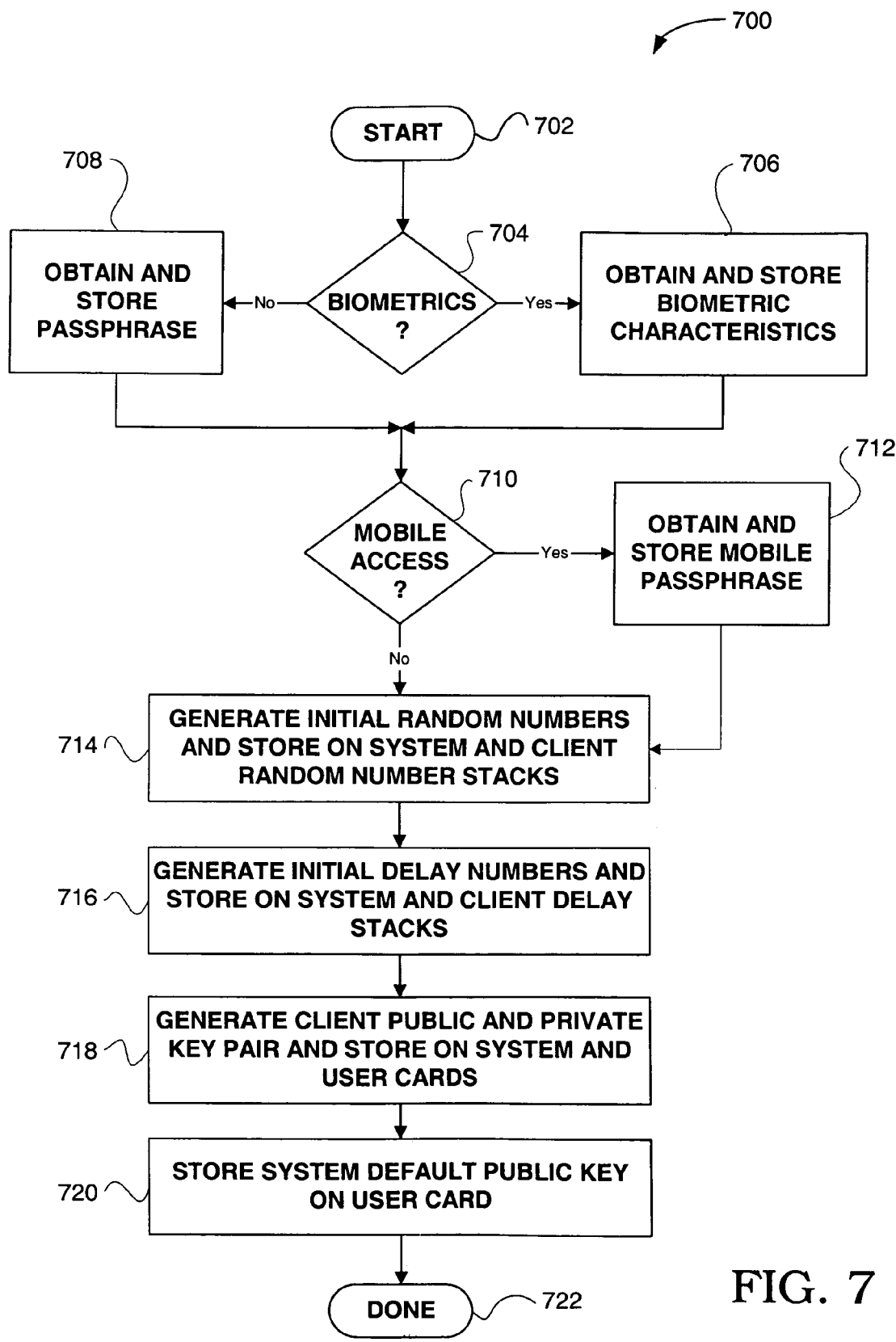
FIG. 7 is a flowchart showing a method for initializing a real-time digital authentication system, in accordance with an embodiment of the present invention.

Upon initial use of the real-time digital authentication system, or whenever a new user is added, an initialization process is invoked. FIG. 7 is a flowchart showing a method 700 for initializing a real-time digital authentication system, in accordance with an embodiment of the present invention. In an initial operation 702, preprocess operations are performed. Preprocess operations include creating system default public and private keys, provisioning the communication network between the server and client computers, and other preprocess operations that will be apparent to those skilled in the art.

A decision is made as to whether the authentication will include biometric data, in operation 704. Biometric data includes fingerprint scans, voiceprints, retinal scans, and hand measurements, and other biometric data as will be apparent to those skilled in the art. In this disclosure, biometric data is also meant to include any form of input/output in which the user is required to interact physically with a device (the User Card, a biometric scanner, or other device) which is attached to the host system. This might include, for example, a keypad on the User Card into which the user must enter their PIN or passphrase. As will be seen below, the requirement that the user interact directly with a piece of hardware that is resident on the host machine during the time of authentication eliminates the risk of a user employing any of a number of remote control programs to enter data remotely without being physically present at the authorized machine. If the authentication operations will include biometric data, the method 700 proceeds to operation 706. Otherwise, the method 700 continues with operation 708.

In operation 706, biometric characteristics are obtained from the user. Each user establishes a personal profile of their biometric characteristics, generally, by submitting themselves to a biometric scanning device. This profile is used to control the user's access to the authentication system or machine, as is preferred by the particular system or application employing the device. A preferred embodiment will require that the user interact directly with the biometric access device or other input/output interface that resides solely on the User Card or the user's computing device during the authentication process. This forces the user to be physically present at their machine during the authentication process, and avoids masquerading or other remote access attempts using various remote control programs available on the market today.

A passphrase or PIN is obtained from the user in operation 708. Generally, the passphrase or pin number is known only to the individual user and is not disclosed to others. Referring back to FIG. 6, a summary of the passphrase or PIN, or a brief hash sequence of the biometric characteristics, or combination of these is stored on the System Card 600, shown as PIN data 602 within the profile 606 in FIG. 6. If desired, a system administrator can confirm the user's identity. The system administrator can further add a "seal" to the profile by indicating who the administrator is, the time, date, and location of the initialization, and any additional unique information required by the application.

Turning back to FIG. 7, a decision is then made as to whether mobile access will be available to the user, in operation 710. Mobile access allows authentication of the user when the user is not at a registered location. If mobile access will be available to the user, the method 700 continues with operation 712. Otherwise, the method 700 proceeds to operation 714.

In operation 712, a mobile passphrase is obtained from the user. As explained in greater detail subsequently, the mobile passphrase is utilized by the user when accessing the system from a location other than a pre-registered location stored on the System Card in the user's profile. The mobile passphrase 604 is then encrypted and stored in the user's profile 606 on the System Card 600, as shown in FIG. 6. A preferred embodiment of the mobile passphrase will require the user to interact directly with the User Card or a biometric access device on their mobile computing machine, so that the user is required to be physically present at their machine during the time of authentication. As explained above, this requirement eliminates the risk of someone using a remote control program to spoof the location determination.

Referring back to FIG. 7, initial random numbers are generated and stored on a system random number stack in the user's profile, in operation 714. Similarly, initial delay numbers are generated and stored on a system delay stack in the user's profile, in operation 716. Turning to FIG. 6, the system random number stack 608 is used to store random numbers utilized in authentication. Similarly, the system delay stack 610 is used to store random delay numbers from satellite timing signals. At initialization, the system administrator generates the numbers for the random number stack 608 and system delay stack 610. During use, the particular User Card 410 will generate new numbers for the random number stack 608 and system delay stack 610. Copies of the initial numbers for the random number stack 608 and system delay stack 610 of the System Card 600 are stored in the client random number stack 612 and client delay stack 614 of the User Card 410 at the time of initialization.

Referring back to FIG. 7, in operation 718, a public and private key pair is generated for the User Card 410 on the client computer 409. As shown in FIG. 6, the client public key 616 and client private key 618 are both stored on the User Card 410. In addition, the client public key 616 is stored in a database on the System Card 600. The client public key 616 and client private key 618 are used for encryption, as discussed in greater detail subsequently.

The system default public key 620 is then stored on the User Card 410, as shown in operation 720 of FIG. 7. In the real-time digital authentication system of FIG. 6, the System Card stores a system default public key 620 and a system default private key 622. The system default private key 622 is kept confidential on the System Card 600. However, the system default public key 620 is distributed to the User Card 410 that will access information or data on the server computer through the System Card 600. Post process operations are then performed in operation 722. Post process operations can include additional verification of the user identity, initialization of additional users, and other post process operations that will be apparent to those skilled in the art.

When the user desires to authenticate a file, electronic transaction, or other form of electronic action, the commencement of the authentication process can occur in a variety of ways without limiting the functionality of the device. For example, using a Graphical User Interface ("GUI") the operator can employ a sequence of mouse clicks to initiate the authentication process. Also, a specific sequence of keystrokes, such as ALT-A or some other combination can initiate the process. It is important to note that the system can be configured to either always authenticate each transaction, for security-intense applications such as database transactions in the healthcare industry, or be user-enabled, leaving the decision to authenticate up to the user. Once commenced, the embodiments of the present invention obtain summary data for the client computer, as discussed next with reference to FIG. 8.

Figure 8:
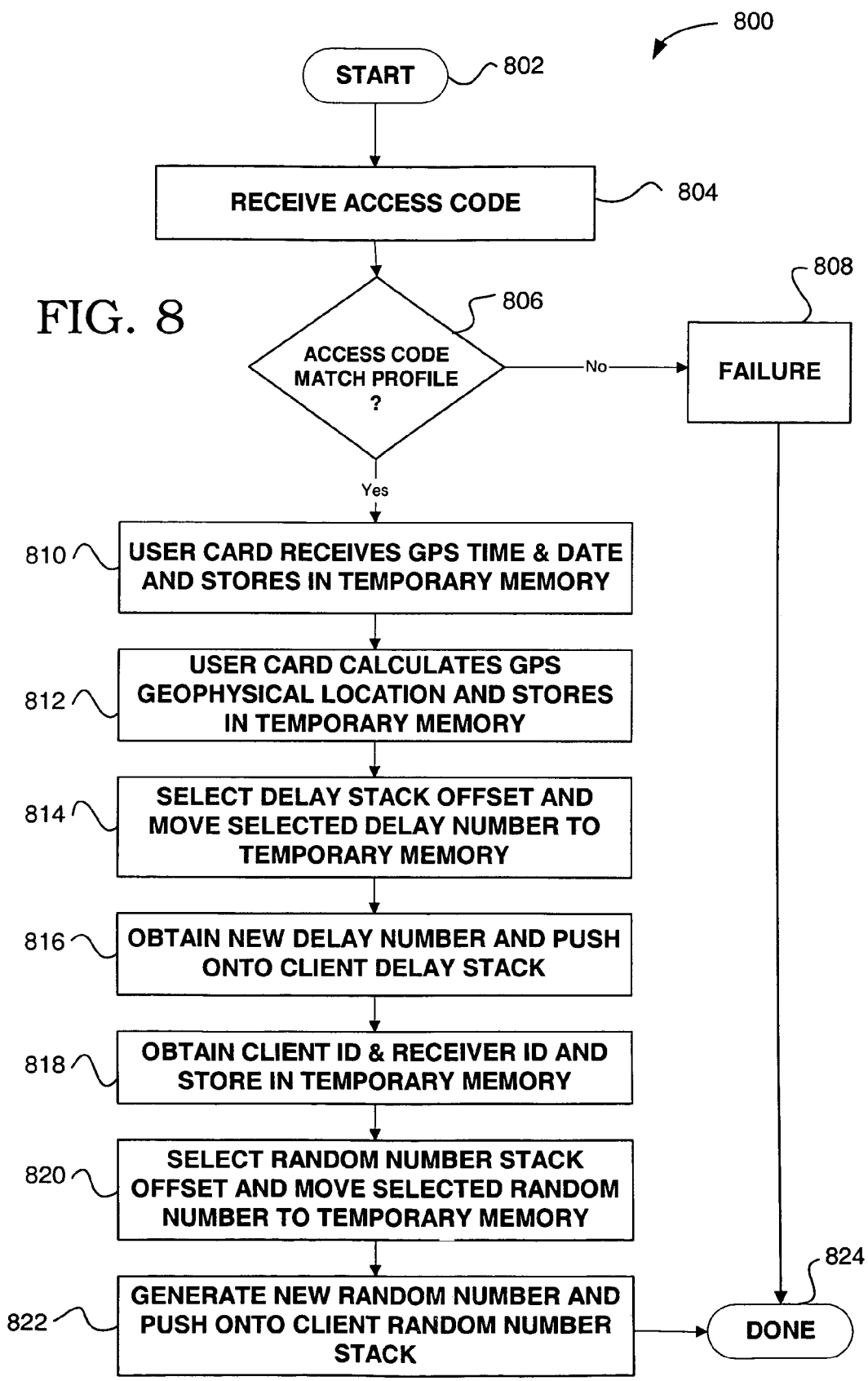
FIG. 8 is a flowchart showing a method for obtain summary data including GPS entropy data, in accordance with an embodiment of the present invention.

FIG. 8 is a flowchart showing a method 800 for obtaining summary data including GPS entropy data for the purpose of authenticating a document or file, or authenticating a user prior to granting access to information or systems, in accordance with an embodiment of the present invention. In an initial operation 802, preprocess operations are performed. Preprocess operations can include initialization of the user profile, creation of a file or transaction to be authenticated, and other preprocess operations that will be apparent to those skilled in the art.

In operation 804, the client device receives an access code from the user. The user is prompted to either enter their passphrase or PIN number. If biometric access is being used, the user is prompted to verify their identity through a biometric access device. The summary of the user's biometric characteristics is then be encrypted and compared against the encrypted profiles stored on the User Card or the System Card.

A decision is then made as to whether the received access code matches the data in the encrypted profiles stored on the User Card or the System Card, in operation 806. In some embodiments, failure to match the profile information will result in a limited number of retries before access is completely denied, in operation 808. If the access code matches the data in the encrypted profiles stored on the User Card or the System Card, the method 800 continues with operation 810.

In operation 810, GPS time and date data is received and stored in temporary memory. In one embodiment, the GPS receiver is activated and the time and date are obtained, as described previously, and stored in a temporary memory area on the User Card. Referring to FIG. 6, the User Card 410 includes a temporary memory 624 that is used to temporarily store summary data. The data in the temporary memory 624 is incorporated into the regular memory of the User Card 410 once authentication of the user has been completed by the challenge/response process that occurs between the User Card 410 and the System Card 600. In operation, time, date, location, device id, User Card id, newly calculated random number and the current measured delay number are all stored in the temporary memory 624 on the User Card 410. Once authentication has been established, the user is granted access to data that resides behind the System Card 600. Alternatively, a local Digital Certificate is created for later authentication as described in greater detail subsequently with reference to FIGS. 9 and 10.

In operation 812, the User Card 410 calculates the geophysical location of the client computer 409 using the GPS timing signals received by the GPS antenna 412. The User Card 410 uses the GPS timing signals to determine the precise geophysical location at that moment, and the geophysical location 628 is stored in temporary memory 624. Since the motion of the GPS satellites is highly complex, duplication of such timing signals by a fake source is essentially unfeasible.

A delay stack offset is determined and the delay number located at the stack offset in the client delay stack is copied to temporary memory, in operation 814. As shown in FIG. 6, the client delay stack 614 includes a plurality of delay numbers. In operation 814, an offset into the client delay stack 614 is determined via a random number or other appropriate manner as will be apparent to those skilled in the art. The offset is then used to index the delay number located at the offset within the client delay stack 614. The selected delay number 630 is then copied to the temporary memory 624.

Referring back to FIG. 8, a new delay number is obtained from the GPS timing signals, in operation 816. Embodiments of the present invention utilize the variances in GPS timing signals as a source for an unpredictable random number. In particular, measurement of the fluctuation in timing signal delay produces a random and unpredictable number whose value depends on the moment to moment value of the various parameters along the path from the satellite to the receiver. Therefore, this delay is specific to each satellite and receiver at a specific time and a specific location, and is extremely difficult, if not impossible, to calculate remotely. Hence, essentially the only way to obtain such a delay is by direct measurement at the specific receiver.

In some embodiments, the differences in the arrival times of the timing signal pulses at the difference frequencies are measured. Since these differences are random, fluctuating and unpredictable due to a wide variety of atmospheric and solar variables, this delay is unique to the precise time, date, and location of the receiver, and specific satellite timing signal being received. The newly obtained delay number is then pushed on the client delay stack 614.

The unique host processor client ID and User Card ID 410 are copied to temporary memory, in operation 818. Each client computer 409 includes a unique host processor client ID 632 and receiver ID 634 from the receiver coupled to the client computer 409. These IDs are added to temporary memory 624 to further uniquely identify the user.

A stack offset is determined and the previously stored random number located at the client random number stack offset in the client random number stack is copied to temporary memory, in operation 820. As shown in FIG. 6, the client random number stack 612 includes a plurality of previously stored random numbers. In operation 820, an offset into the client random number stack 612 is determined, and the offset is then used to index the previously stored random number located at the offset within the client random number stack 612. The selected previously stored random number 634 is then copied to the temporary memory 624.

Referring back to FIG. 8, a new random number is generated and pushed onto the client random number stack 612, in operation 822. The new random number can be generated by well known techniques that will be apparent to those skilled in the art. Post process operations are performed in operation 822. Post process operations can include creating a Digital Certificate using the obtained summary information, authenticating a transaction using the obtained summary information, and other post process operations that will be apparent to those skilled in the art. The process described in FIG. 8 is meant to be instructive. It will be apparent to those skilled in the art that the selection of the delay and random numbers that are copied into temporary memory need not be limited to one each. Multiple randomly selected entries from the random number stack as well as multiple randomly selected delay numbers from the delay number stack can be employed as part of the creation of the summary information, further strengthening the integrity of the process by raising the complexity and entropy higher.

Figure 9:
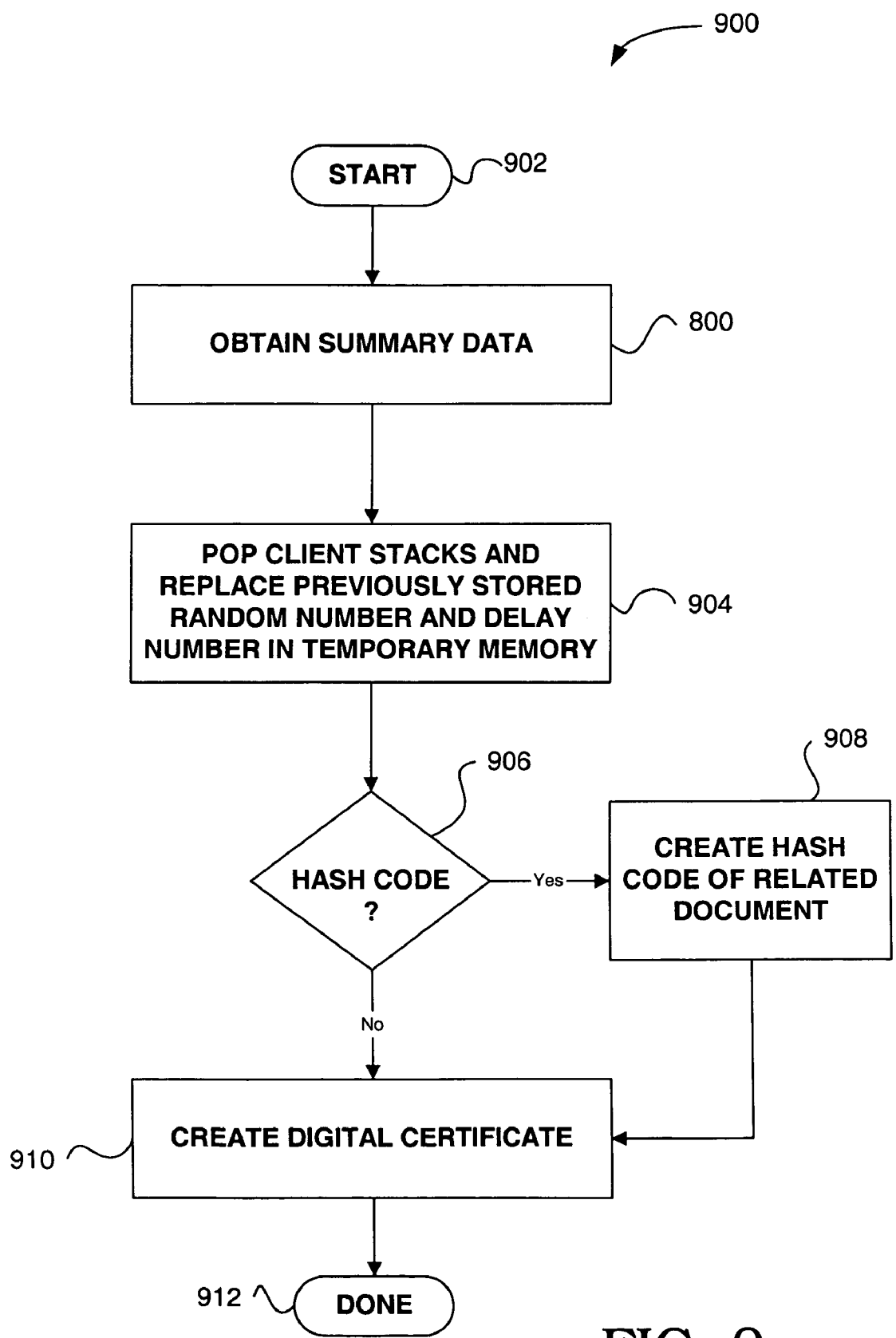
FIG. 9 is a flowchart showing a method for creating a Digital Certificate using obtained client summary information, in accordance with an embodiment of the present invention.

FIG. 9 is a flowchart showing a method 900 for creating a Digital Certificate using obtained client summary information, in accordance with an embodiment of the present invention. In an initial operation 902, preprocess operations are performed. Preprocess operations can include initializing a new user profile, provisioning a new client computer system, and other preprocess operations that will be apparent to those skilled in the art.

In operation 800, summary data including GPS entropy data is obtained. Summary data is obtained as discussed previously with respect to method 800 of FIG. 8. The obtained summary data is stored in temporary memory 624 and the client random number stack 612 and the client delay stack 614 are updated as discussed above.

In operation 904, the client random number stack and the client delay stack are popped and the old random number and old delay number in temporary memory are replaced with the new random number and new delay number popped off the temporary memory of the User Card. In this manner, the new random number and new delay number can be used for the creation of the Digital Certificate while keeping the client stacks 612 and 614 synchronous with the server stacks 608 and 610.

A decision is then made as to whether a hash code of the related document is to be included with the Digital Certificate, in operation 906. If a hash code of the related document is to be included with the Digital Certificate the method 900 proceeds to operation 908. Otherwise, the method 900 continues with operation 910.

In operation 908, a hash code is created for the related document. The hash code function converts a variable-sized amount of text into a fixed-sized output, or hash value. As a result, the hash code allows changes to be detected if the related document is changed.

The Digital Certificate is then created in operation 910. The client public key 616 is used in conjunction with the client private key 618 to encrypt the summary data in the temporary memory 624 using PKI dual key encryption. The resulting Digital Certificate can then attest to the time, date, location, user, processor ID, receiver ID, new delay number, and new random number. If a hash code of the related document was created in operation 908, the hash code can be used subsequently to detect any changes to the related document content since certification. Post process operations are then performed in operation 912.

Post process operations include storing the Digital Certificate and related file on a storage medium, subsequent authentication operations, and other post process operations that will be apparent to those skilled in the art. In addition to facilitating Digital Certificate creation, the summary data can be used in transactions wherein a transmission is to occur, as discussed in greater detail next with reference to FIG. 10.

Figure 10:
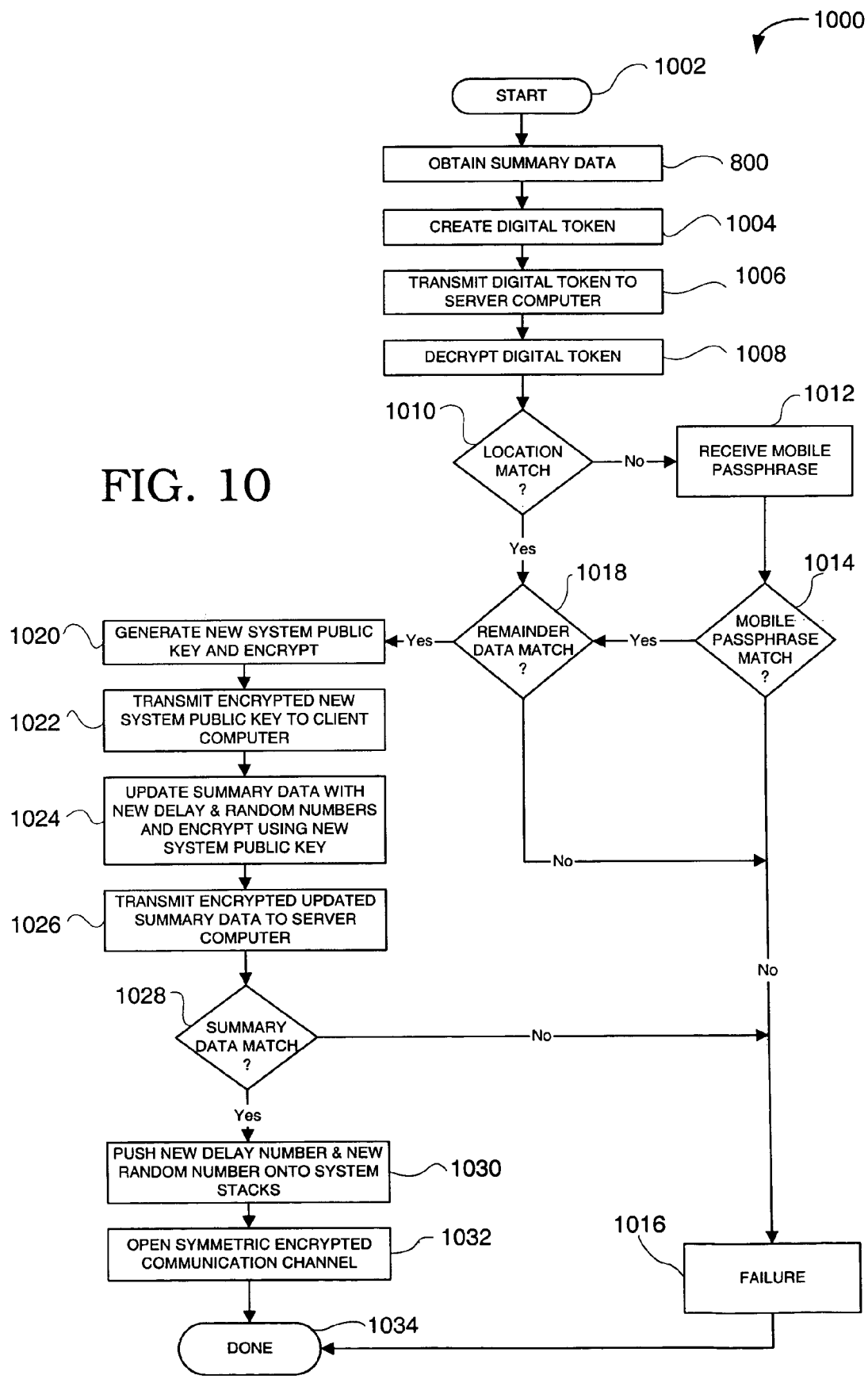
FIG. 10 is flowchart showing a method for authenticating a remote transaction, in accordance with an embodiment of the present invention.

FIG. 10 is flowchart showing a method 1000 for authenticating a remote transaction, in accordance with an embodiment of the present invention. In an initial operation 1002, preprocess operations are performed. Preprocess operations include establishing a connection with a remote server computer, commencing the transaction application, and other preprocess operations that will be apparent to those skilled in the art.

In operation 800, summary data including GPS entropy data is obtained. Summary data is obtained as discussed previously with respect to method 800 of FIG. 8. The obtained summary data is stored in temporary memory 624 and the client random number stack 612 and the client delay stack 614 are updated as discussed above.

A digital token is created in operation 1004. As shown in FIG. 6, the User Card 410 uses the system default public key 620 in conjunction with the client private key 618 to encrypt the summary data stored in the temporary memory 624 into a digital token 636. For example, in FIG. 6 the summary data includes the GPS time and date 626, the calculated geophysical location 628, the selected previously stored delay number 630, the selected previously stored random number 634, the client ID 632a, and the receiver ID 632b. It should be borne in mind that the digital token 636 is not required to include all the information stored in temporary memory 624. In some embodiments, some amount of summary information less than all the information shown in the temporary memory 624 of FIG. 6 is encrypted into the digital token 636.

Referring back to FIG. 10, the digital token is transmitted to the server computer in operation 1006. Upon receipt, the server computer decrypts the digital token, in operation 1008. As illustrated in FIG. 6, the server computer 600 decrypts the digital token 636 using the system default private key 622. The server computer 600 then compares the summary data included in the digital token 636 to the data included in the user profile 606.

A decision is then made as to whether the GPS geophysical location data included in the digital token matches the GPS geophysical location data included in the user profile, in operation 1010. If the GPS geophysical location data included in the digital token matches the GPS geophysical location data included in the user profile, the method 1000 continues with operation 1018. Otherwise, the method 1000 branches to operation 1012.

In operation 1012, the System Card requests a mobile passphrase for the user. More specifically, the System Card encrypts a token using the system default private key and the client's public key. When decrypted, the contents of the token request that the User Card challenge the user for his/her mobile passphrase. The User Card issues a request to the Host Processor and the user is presented with a dialog box requesting that the mobile passphrase that was established during initialization be entered. The passphrase entered by the user is then returned to the User Card, which encrypts the response into a token using the system default public key and its client private key. Upon receipt, the System Card decrypts the token and compares the passphrase against the passphrase stored in the user's profile.

When the geophysical location data for the user does not match the profile, the transaction can still be authenticated if the user is approved for mobile access. Hence, in operation 1012, the user is prompted for their mobile passphrase. A decision is then made as to whether the mobile passphrase matches the mobile passphrase stored in the user's profile, in operation 1014. If the mobile passphrase matches the mobile passphrase stored in the user's profile, the method 1000 continues with operation 1018. Otherwise, the method 1000 continues with an authentication failure operation 1016. In the authentication failure operation 1016, access to the server computer is denied and the system administrator is notified to take any subsequent actions that have been instituted by the organization.

In operation 1018, a decision is made as to whether the remainder of the summary data included in the digital token matches the data included in user's profile. For example, the client ID and receiver ID can be validated. In addition, the delay number 630 and random number 634 included in the digital token are compared to the corresponding delay number and random number stored in the system delay stack 610 and system random number stack 608 at the same offsets used for the digital token data. This stack offset check further increases system security since system attackers would need to know both the actual random and delay numbers included in the stacks and the offsets used to index into the stacks. If the remainder of the summary data included in the digital token matches the data included in user's profile, the method 1000 continues with operation 1020. Otherwise, the method 1000 branches to the authentication failure operation 1016. As explained above, it is not the intent of this example to limit the use of random number and delay number offsets to just one. Multiple offsets can comprise a challenge to further strengthen the authentication process against attacks.

In operation 1020, a new system public key is generated and encrypted. As shown in FIG. 6, the server computer 600 uses the client public key 616 in conjunction with the system default private key 622 to encrypt the new system public key 638. The encrypted new system public key 638 is then transmitted to the client computer 410, in operation 1022.

The new random number and new delay number are copied into temporary memory and the summary data in temporary memory is encrypted using the new system public key, in operation 1024. Referring to FIG. 6, the client computer 410 replaces the previously stored delay number 630 and the previously stored random number 634 in temporary memory 624 with the new random number and new delay number copied from the client random number stack 612 and client delay number stack 614. The client computer 410 then encrypts the updated summary data in temporary memory 624 using the new system public key 620 in conjunction with the client private key 618. Referring back to FIG. 10, the encrypted updated summary data is transmitted to the server computer in operation 1026. The server computer then uses the system private key 622 to decrypt the summary data and compares the summary data to the data included in the user's profile 606.

A decision is then made as to whether the received summary data, excluding the new delay and random numbers, matches the data stored in the user's profile, in operation 1028. If the summary data, excluding the new delay and random numbers, matches the data stored in the user's profile, the method 1000 continues with operation 1030. Otherwise, the method branches to the authentication failure operation 1016.

In operation 1030, the new delay number and the new random number included in the updated summary data are pushed onto the system stacks. Referring to FIG. 6, the new delay number 630 included in the updated summary data 624 is pushed onto the system delay stack 610. Similarly, the new random number 634 included in the updated summary data 624 is pushed onto the system random number stack 608.

Referring back to FIG. 10, a symmetric encrypted channel is then opened in operation 1032. A high speed symmetric encrypted channel is opened between the client computer 410 and the server computer 600. High speed encrypted communication is then permitted using a secure encryption technique, such as Security Sockets Layer (SSL), Data Encryption Standard (DES), Rijndael, or any other high speed encryption technique known to those skilled in the art.

To complete synchronization of the system and user stacks, the System Card sends an authentication acknowledgment to the User Card through the symmetric encrypted channel. Upon receipt of the authentication acknowledgment message from the System Card, the User Card pops the new random number(s) and delay number(s) from the temporary memory location and pushes them onto their respective stacks. In this way, the System and User stacks remain synchronized and are updated with each successive authentication.

Embodiments of the present invention can further be used to generate self-protecting electronic data files. In particular, embodiments of the present invention protect electronic files utilizing an environment profile that describes the operating environment of the client computer. In this manner, only a client computer conforming to the operating environment as defined in the environment profile can access data files protected using the embodiments of the present invention.

Figure 11:
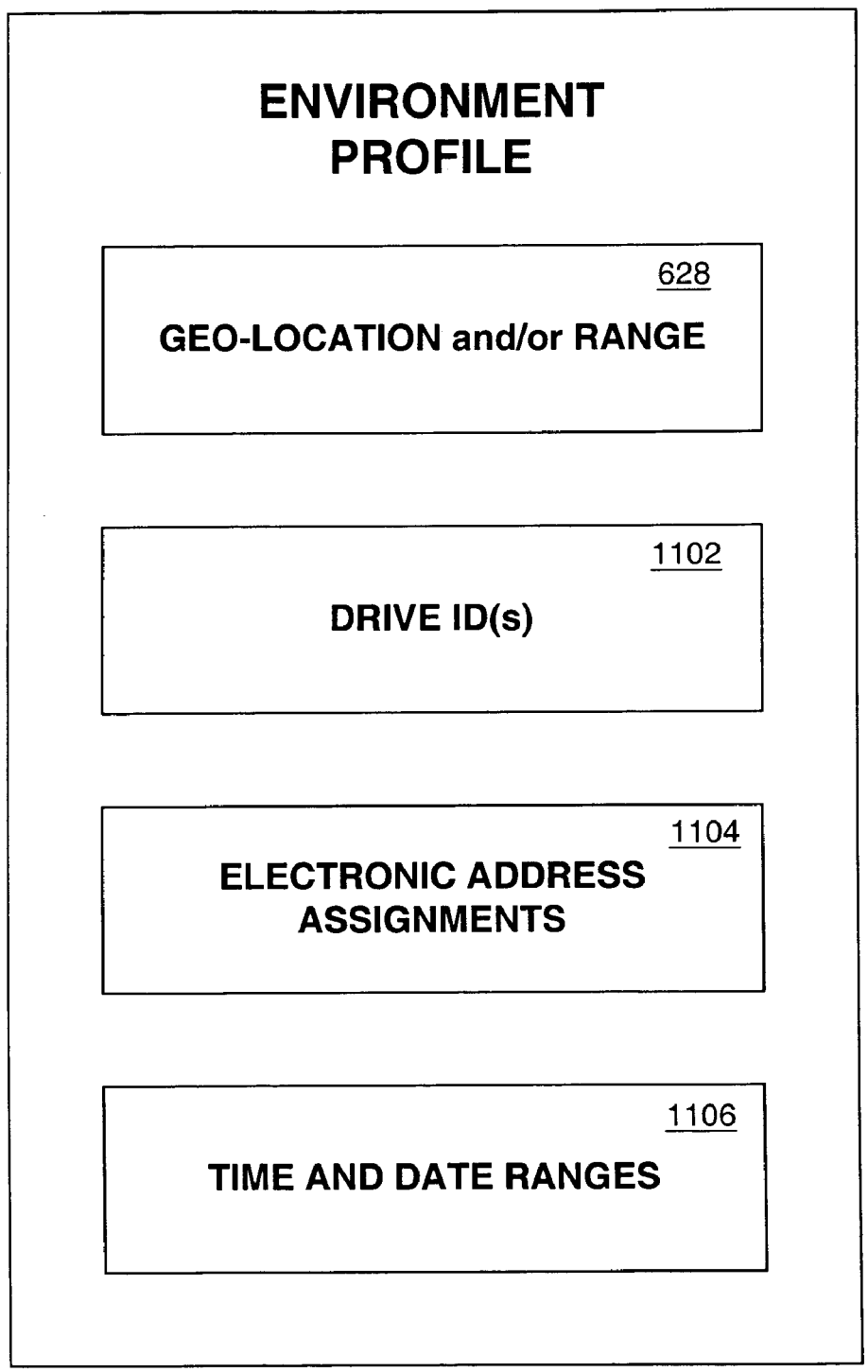
FIG. 11 is a logical diagram showing an exemplary environment profile, in accordance with an embodiment of the present invention.

FIG. 11 is a logical diagram showing an exemplary environment profile 1100, in accordance with an embodiment of the present invention. The exemplary environment profile 1100 is a number, which is hashed or otherwise obtained from the operating environment of the client computer, that allows encrypted files to be environment-sensitive. As a result, the environment profile 1100 introduces an environmental component that can used to prevent decryption of a file if any component of the environment has changed. For example, the exemplary environment profile 1100 illustrated in FIG. 11 can be based on the geo-location and/or geo-location range 628, drive ID(s) 1102, electronic address assignments 1104, and a time and date range 1106.

The geo-location 628 is the physical location of the client computer as determined using external timing signals, such as GPS technology. As described above, the GPS system is a set of 24 satellites launched by the U.S. Department of Defense that are configured to facilitate identifying earth locations. The satellites of a GPS system provide timing signals, usually broadcast at 1.57 Ghz, that are received by the User Card through the GPS antenna. Although the following description is in terms of GPS technology, it should be noted that any external timing signals can be utilized by the embodiments of the present invention.

Embodiments of the present invention can also base the environmental profile 1100 on a pre-set association of a multiplicity of disk drives, each with a unique ID 1102, to a multiplicity of addresses. These addresses may be geo-location addresses, possibly unique for each drive, or may be physical electronic device addresses 1104 of each drive as it is configured to operate within a bank of other disk drives. Of course some combination of these is also envisioned by this disclosure. Hence, the disk on which the protected file resides is intimately tied to the protected file and the user's location. As a result, if the drive is replaced or the file is copied to another device, the protected file will become unreadable.

The environmental profile 1100 can be further based on a time and date range 1106. The time range 1106 can define a range of time and dates wherein the file may be accessed. Since the embodiments of the present invention obtain time information from external timing signals, such as the GPS system, users cannot "spoof" the system by altering their system, or other internal clock. As can be seen, when the external timing signal no longer indicates a time or date within the given time or date range 1106, the operating environment will no longer match the environment profile 1100. As a result, the user will no longer be able to access the protected file. The embodiments of the present invention utilize the environmental profile 1100 to generate a public and private key pair for use in encrypting and decrypting the data file.

Figure 12:
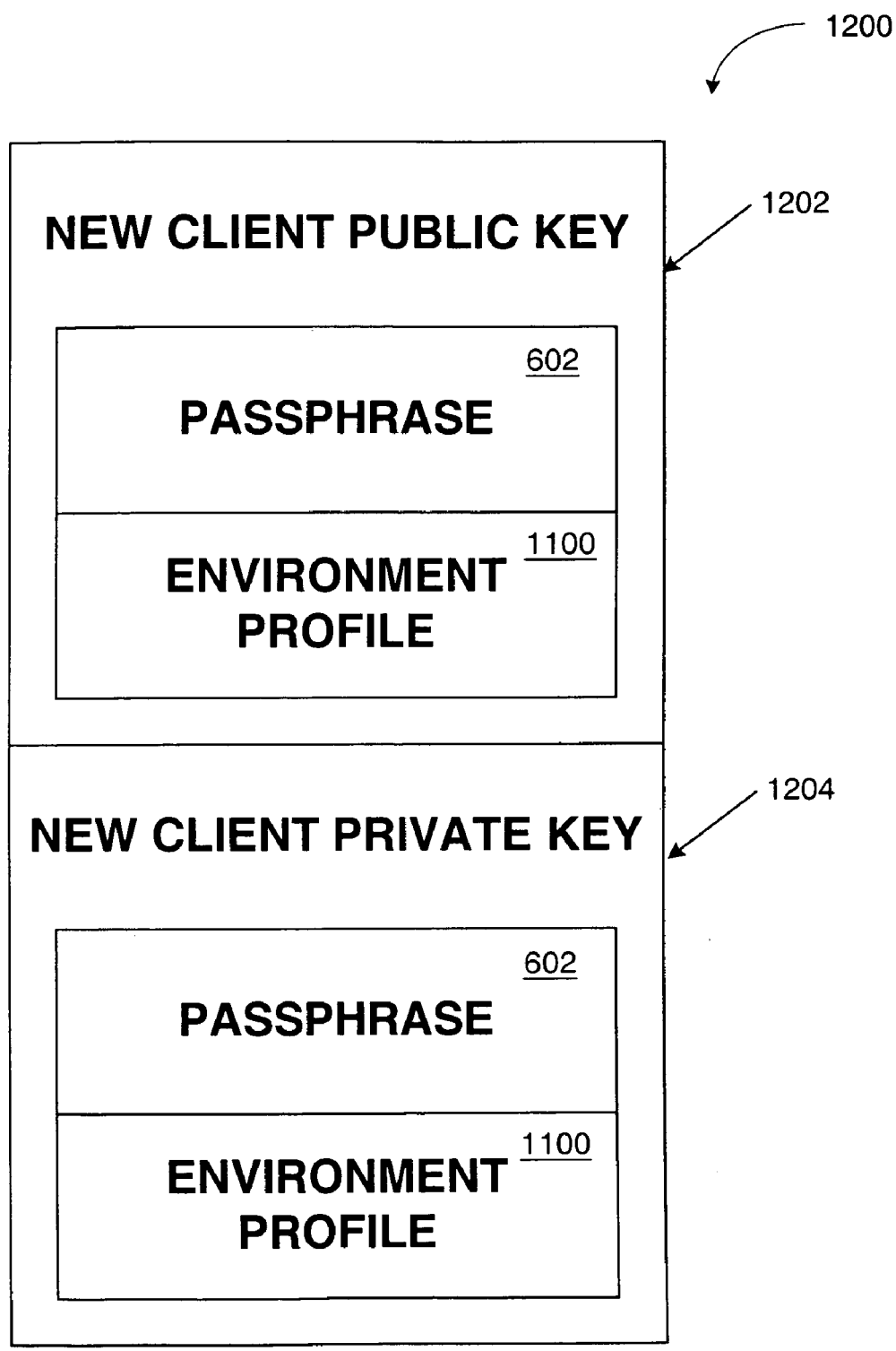
FIG. 12 is a logical diagram showing a new client public and private key pair generated using an environmental profile, in accordance with an embodiment of the present invention.

FIG. 12 is a logical diagram showing a new client public and private key pair 1200 generated using an environmental profile, in accordance with an embodiment of the present invention. The key pair 1200 comprises a new client public key 1202 and a new client private key 1204. Both the new client public key 1202 and the new client private key 1204 are generated based on the user's passphrase 602 and on the environment profile 1100 of the client computer.

When generating a key pair for public key encryption, the user is asked to enter a passphrase 602, which is a sequence known only to the user. The passphrase 602 includes enough random information that a strong public and private key pair can be generated based on the passphrase 602. However, embodiments of the present invention also append the environment profile 1100 of the client computer to the passphrase 602 before creation of the new client public and private key pair 1200, which is used to encrypt self-protecting data files for the client computer.

In this manner, a data file, System Card, or User Card can lock up data upon the change of any one or more devices from their original prescribed configuration of geo-physical and electronic addresses. The movement, removal, or re-arrangement of one or more drives will cause the composition of the environment profile to change, thereby creating an incorrect key for use in the decryption process. An invalid key, of course, will be unable to decrypt the file.

Figure 13:
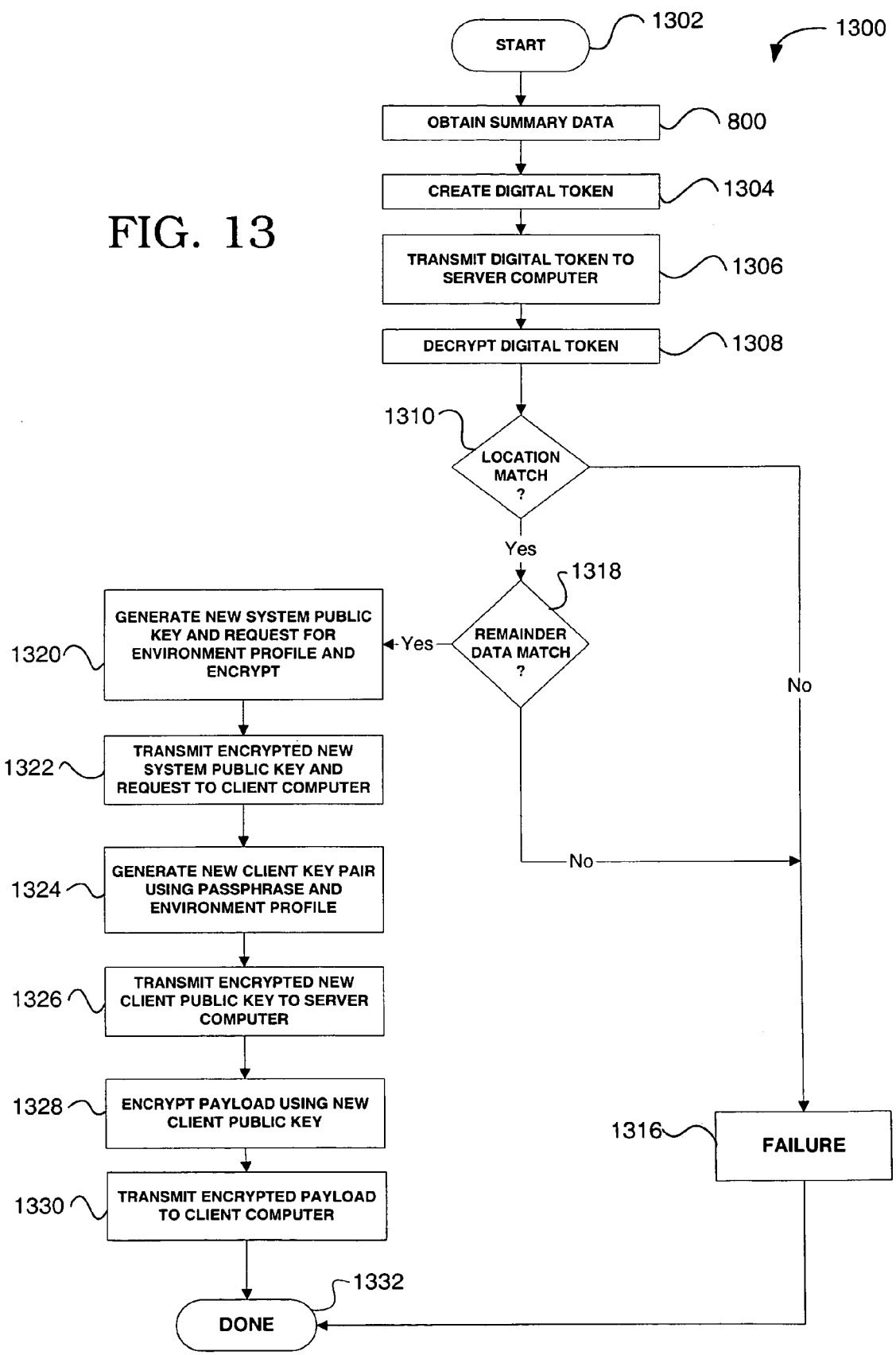
FIG. 13 is a flowchart showing a method for protecting electronic files based on location, in accordance with an embodiment of the present invention.

FIG. 13 is a flowchart showing a method 1300 for protecting electronic files based on location, in accordance with an embodiment of the present invention. In an initial operation 1302, preprocess operations are performed. Pre-process operations include establishing a connection with a remote server computer, commencing the transaction application, and other preprocess operations that will be apparent to those skilled in the art.

In operation 800, summary data including GPS entropy data is obtained.

Summary data is obtained as discussed previously with respect to method 800 of FIG. 8. The obtained summary data is stored in temporary memory 624 and the client random number stack 612 and the client delay stack 614 are updated as discussed above.

A digital token is created in operation 1304. The User Card uses the system default public key in conjunction with the client private key to encrypt the summary data stored in the temporary memory into a digital token. For example, the summary data can include the GPS time and date, the calculated geophysical location, the selected previously stored delay number, the selected previously stored random number, the client ID, and the receiver ID. It should be borne in mind that the digital token is not required to include all the information stored in temporary memory. In some embodiments, some amount of summary information less than all the information shown in the temporary memory mentioned above is encrypted into the digital token.

The digital token is transmitted to the server computer in operation 1306. Upon receipt, the server computer decrypts the digital token, in operation 1308. The server computer decrypts the digital token using the system default private key. The server computer then compares the summary data included in the digital token to the data included in the user profile.

A decision is then made as to whether the GPS geophysical location data included in the digital token matches the GPS geophysical location data included in the user profile, in operation 1310. If the GPS geophysical location data included in the digital token matches the GPS geophysical location data included in the user profile, the method 1300 continues with operation 1318. Otherwise, the method 1300 continues with an authentication failure operation 1316. In the authentication failure operation 1316, access to the server computer is denied and the system administrator is notified to take any subsequent actions that have been instituted by the organization.

In operation 1318, a decision is made as to whether the remainder of the summary data included in the digital token matches the data included in user's profile. For example, the client ID and receiver ID can be validated. If the remainder of the summary data included in the digital token matches the data included in user's profile, the method 1300 continues with operation 1320. Otherwise, the method 1300 branches to the authentication failure operation 1316.

Figure 14:
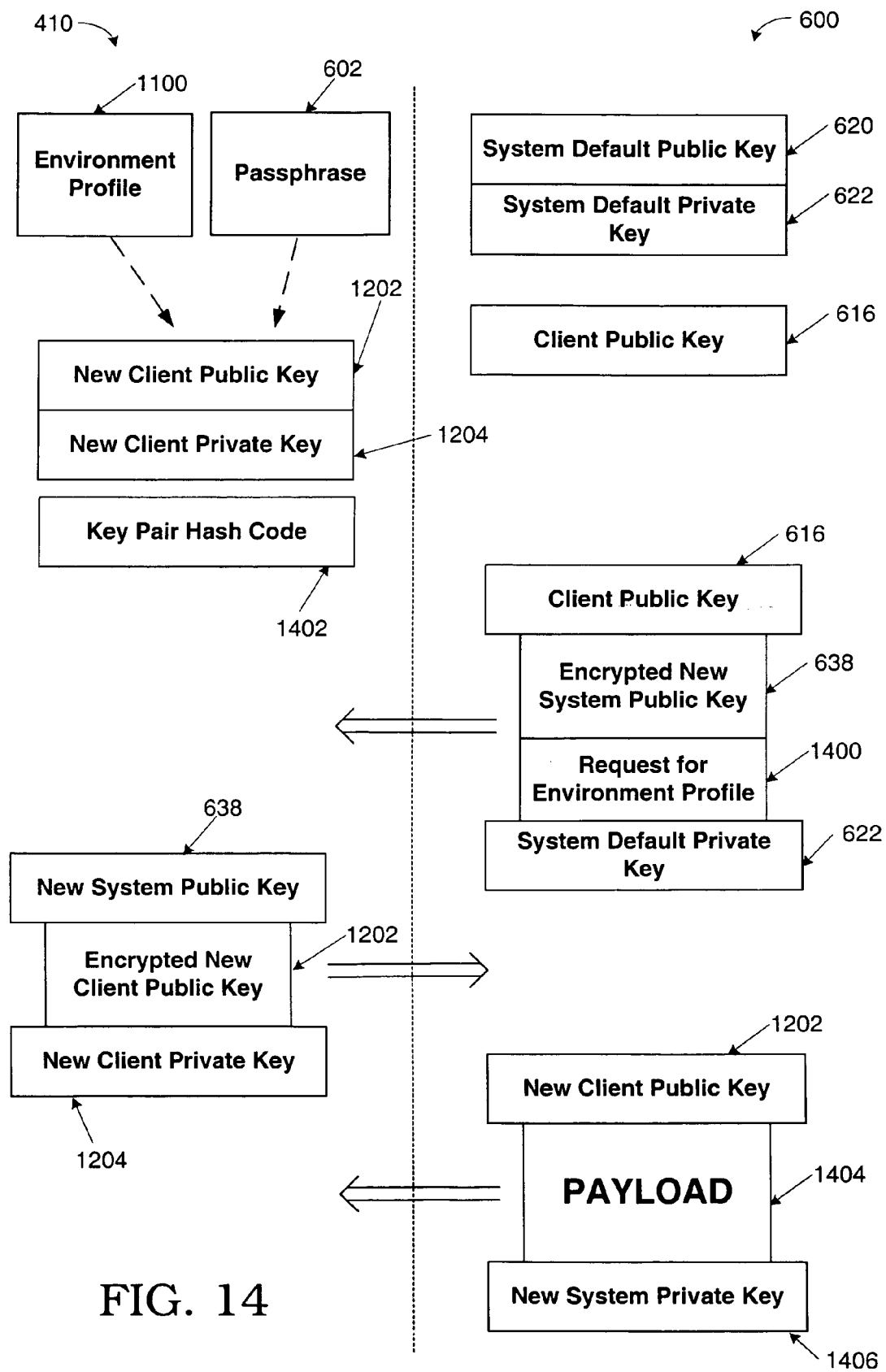
FIG. 14 is a logical diagram showing a real-time file protection system, in accordance with an embodiment of the present invention.

A new system public key is generated and both the new system public key and a request for the environment profile are encrypted, in operation 1320. FIG. 14 is a logical diagram showing a real-time file protection system, in accordance with an embodiment of the present invention. As shown in FIG. 14, the server computer 600 uses the client public key 616 in conjunction with the system default private key 622 to encrypt the new system public key 638 and the request 1400 for the environment profile. The encrypted new system public key 638 and encrypted request 1400 are then transmitted to the client computer 410, in operation 1322. In further embodiments of the present invention, operation 1320 can be performed after a fully authenticated communication channel has been established. In such embodiments, operation 1320 can follow operation 1032 of FIG. 10.

In response to receiving and decrypting the request 1400 for the environment profile, the client computer generates a new client key pair, in operation 1324. Turning to FIG. 14, the client computer 410 generates both the new client public key 1202 and new client private key 1204 based on the user's passphrase 602 and the environment profile 1100, as described above with reference to FIG. 12. In addition, embodiments of the present invention can also store a key pair hash code 1402, which is a number hashed from the passphrase 602 and the environment profile 1100. The key pair hash code 1402 can later be used to check the operating environment during future file access, as described in greater detail subsequently. The new client public key 1202 is then encrypted using the new system public key 638 and the new client private key 1204, and transmitted to the server computer 600 in operation 1326.

Referring back to FIG. 13, the server computer encrypts the payload using the new client public key, in operation 1328. As shown in FIG. 14, the server computer 600 encrypts the payload 1404, which is the electronic data being protected, using the new client public key 1202 and the new system private key 1406. The encrypted payload 1404 is then transmitted to the client computer 410, in operation 1330.

Post process operations are performed in operation 1332. Post process operations can include user access to the encrypted payload data file, further file transmissions, and other post process operations that will be apparent to those skilled in the art. Since the payload 1404 is encrypted using the new client public key 1202, which is based on the environment profile 1100, the encrypted payload 1404 data file becomes self-protecting. That is, any change in the expected operating environment of the client computer causes the encrypted payload 1404 to be unreadable. Thus, if a user attempts to access the file at a new location or from a new drive, for example, the user will be unable to access the encrypted payload 1404, as described next with reference to FIG. 15.

Figure 15:
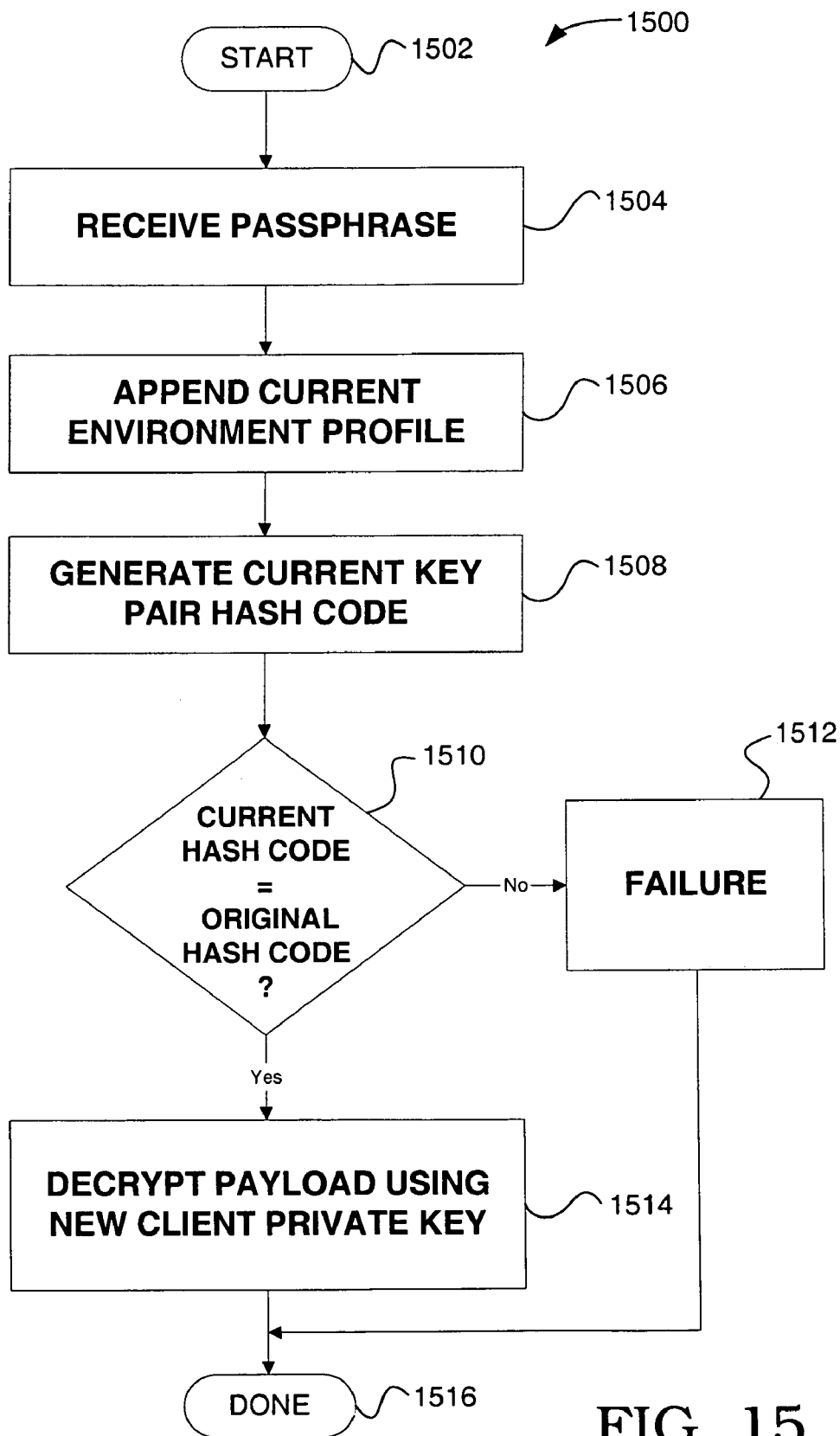
FIG. 15 is a flowchart showing a method 1500 for accessing an encrypted data file, in accordance with an embodiment of the present invention.

FIG. 15 is a flowchart showing a method 1500 for accessing an encrypted data file, in accordance with an embodiment of the present invention. In an initial operation 1502, preprocess operations are performed. Preprocess operations can include authorizing a transaction to receive the encrypted data file, generating an environment profile, receiving the encrypted data file, and other preprocess operations that will be apparent to those skilled in the art.

In operation 1504, the user's passphrase is received. The user is prompted to either enter their passphrase or PIN number. If biometric access is being used, the user is prompted to verify their identity through a biometric access device. A summary of the user's biometric characteristics can then be created. In some embodiments, the passphrase or biometric summary can be compared to a stored user profile to authenticate the user.

The current environment profile is then appended to the passphrase, in operation 1506. As mentioned above, the environment profile is based on the operating environment of the client computer and can include geo-location, drive ID(s), electronic address assignments, time ranges, and other environmental variables that can be obtained or measured. These environmental variables are then hashed to created a current environment profile that represents the current operating environment of the client computer.

In operation 1508, the passphrase and the appended current environment profile are hashed to create a current key hash code. As mentioned above, embodiments of the present invention process the passphrase and the appended environment profile to generate the new client public and private key pair, which is used for file encryption. In addition, during the new client key pair creation, the hash code based on the new client public and private key pair and environment profile can be saved. This saved original key pair hash code can be used for verification.

A decision can then be made as to whether the current key pair hash code matches the original key pair hash code, in operation 1510. If the current key pair hash code does not match the original key pair hash code, the method 1500 fails in operation 1512. Hence, the file access can fail because of a change in the operating environment as well as by entering the wrong passphrase. If the current key pair hash code matches the original key pair hash code, the method 1500 continues with a decrypting operation 1514.

In decrypting operation 1514, the encrypted payload data file is decrypted using the new client private key. Hence, if the expected operating environment is maintained at the time of file access, the new client private key is used to decrypt the data file. In a further embodiment of the present invention, the passphrase and appended current environment profile are used to generate another new client private key. This client private key is then used to decrypt the payload data. However, the movement, removal, or re-arrangement of one or more environment variables will cause the composition of the environment profile to change, thereby creating an incorrect private key for use in the decryption process. An invalid key, of course, will be unable to decrypt the file. Hence, as mentioned above, the embodiments of the present invention allow a data file, System Card, or User Card to lockup data upon the change of any one or more devices from their original prescribed configuration of geophysical and electronic addresses.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for protecting electronic files, comprising:
receiving first and second timing signals from a remote source using a receiver;
computing a delay number, the delay number being a measure of a variation between arrival times of the first and second timing signals at the receiver;
obtaining environment information regarding a computer, the environment information including the delay number and data concerning an operating environment of the computer;
creating an encryption key based on the environment information; and
encrypting an electronic file using the encryption key.

2. A method as recited in claim 1, further comprising the operation of creating a decryption key based on environment information, wherein the decryption key can be utilized to decrypt the electronic file.

3. A method as recited in claim 2, wherein the encryption key and the decryption key are public key infrastructure (PKI) based keys.

4. A method as recited in claim 1, wherein the environment information includes location information of the computer.

5. A method as recited in claim 4, wherein the location information specifies a location of the computer within a predetermined range.

6. A method as recited in claim 5, wherein the location information is provided by global positioning satellite (GPS) data.

7. A method as recited in claim 1, wherein the environment information includes drive information regarding a drive wherein the electronic file will be stored.

8. A method as recited in claim 7, wherein the drive information includes a drive identifier that identifies the particular drive wherein the electronic file will be stored.

9. A method as recited in claim 7, wherein the drive information includes an electronic address assignment of the particular drive wherein the electronic file will be stored.

10. A method as recited in claim 1, wherein the environment information includes time information specifying access duration.

11. A method as recited in claim 10, wherein the access duration is a time range indicating a time period when the electronic file can be accessed.

12. A method as recited in claim 11, wherein the electronic file cannot be decrypted at a time outside the time range.

13. A method as recited in claim 10, wherein the access duration is a date range indicating a range of dates when the electronic file can be accessed.

14. A method as recited in claim 13, wherein the electronic file cannot be decrypted at a date outside the date range.

15. A method for protecting electronic files, comprising:
receiving first and second timing signals from a remote source using a receiver;
computing a first delay number, the first delay number being a measure of a variation between arrival times of the first and second timing signals at the receiver;
storing an electronic file encrypted using an encryption key, wherein the encryption key is created using a first environment profile of a computer, and wherein the environment profile includes the first delay number and data concerning an operating environment of the computer;
receiving third and fourth timing signals from the remote source using the receiver;
computing a second delay number, the second delay number being a measure of a variation between arrival times of the third and fourth timing signals at the receiver;
creating a decryption key based on a second environment profile of the computer, the second environment profile being based on a current operating environment of the computer and the second delay number; and
decrypting the electronic file using the decryption key.

16. A method as recited in claim 15, wherein the encryption key and the decryption key are further based on a passcode received from a user.

17. A method as recited in claim 16, further comprising the operation of appending the first environment profile to the passcode to generate the encryption key.

18. A method as recited in claim 17, further comprising the operation of appending the current environment profile to the passcode to create the decryption key.

19. A method as recited in claim 18, wherein the decryption key cannot decrypt the electronic file when the current environment profile does not match the first environment profile.

20. A method as recited in claim 19, wherein a match occurs when the data in the current environment profile is within a predetermined range of the data in the first environment profile.

21. A method as recited in claim 15, wherein the environment profile includes location information specifying a location of the computer within a predetermined range.

22. A method as recited in claim 21, wherein the location information is provided by global positioning satellite (GPS) data.

23. A method as recited in claim 15, wherein the environment information includes drive information regarding a drive wherein the electronic file will be stored.

24. A method as recited in claim 15, wherein the environment information includes time information specifying access duration, wherein the access duration is a time range indicating a time period when the electronic file can be accessed.

25. A method as recited in claim 15, wherein the environment information includes date information specifying access duration, wherein the access duration is a date range indicating dates that the electronic file can be accessed.

26. A method for protecting electronic files, comprising:
receiving first and second timing signals from a remote source using a receiver;
authenticating a digital transaction using a delay number, the delay number being a measure of a variation between arrival times of the first and second timing signals at the receiver;
obtaining environment information regarding a computer, the environment information including the delay number and data concerning an operating environment of the computer;
creating an encryption key based on the environment information; and
encrypting an electronic file using the encryption key.

27. A method as recited in claim 26, wherein the delay in the timing signal is caused by free electrons in a line of sight between the remote source and a receiver.

28. A method as recited in claim 27, wherein the delay in the timing signal is further caused by variations in atmospheric conditions.

* * * * *